(12) United States Patent
Schmaelzle et al.

(10) Patent No.: US 8,887,711 B2
(45) Date of Patent: *Nov. 18, 2014

(54) SOLAR TOWER SYSTEM WITH CAROUSEL HELIOSTATS

(75) Inventors: Philipp H. Schmaelzle, Los Altos, CA (US); Patrick C. Cheung, Castro Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 747 days.

This patent is subject to a terminal disclaimer.

(21) Appl. No.: 13/215,185

(22) Filed: Aug. 22, 2011

(65) Prior Publication Data

US 2013/0047609 A1  Feb. 28, 2013

(51) Int. Cl.
| | |
|---|---|
| F03G 6/06 | (2006.01) |
| F24J 2/52 | (2006.01) |
| F24J 2/10 | (2006.01) |
| F24J 2/38 | (2014.01) |
| F24J 2/54 | (2006.01) |
| F24J 2/36 | (2006.01) |
| F24J 2/00 | (2014.01) |

(52) U.S. Cl.
CPC .............. F24J 2/1047 (2013.01); *Y02E 10/47* (2013.01); *Y02E 10/46* (2013.01); *F24J 2/38* (2013.01); *F24J 2002/108* (2013.01); *F24J 2002/5437* (2013.01); *F24J 2002/5475* (2013.01); *F24J 2002/109* (2013.01); *F24J 2/36* (2013.01); *F24J 2002/0084* (2013.01); F24J 2/542 (2013.01); F03G 6/067 (2013.01)
USPC ............................ 126/574; 126/571; 126/605

(58) Field of Classification Search
CPC ............... F24J 2/18; F24J 2/46; F24J 2/5431
USPC ................................................. 126/574, 605
See application file for complete search history.

(56) References Cited

U.S. PATENT DOCUMENTS

| 1,111,239 A | 9/1914 | Smelser |
| 2,712,772 A | 7/1955 | Trombe |

(Continued)

FOREIGN PATENT DOCUMENTS

| WO | 2010/033859 A2 | 3/2010 |
| WO | 2011/012545 A1 | 2/2011 |
| WO | 2011/148307 A2 | 12/2011 |

OTHER PUBLICATIONS

Dersch, Jürgen, et al. "Trough integration into power plants-a study on the performance and economy of integrated solar combined cycle systems", Energy, vol. 29, Issues 5-6, Apr.-May 2004, pp. 947-959.

(Continued)

*Primary Examiner* — Kang Hu
*Assistant Examiner* — Benjamin W Johnson
(74) *Attorney, Agent, or Firm* — Bever, Hoffman & Harms, LLP; Patrick T. Bever

(57) ABSTRACT

A solar tower system including an array of individually controlled carousel-type heliostats, where each heliostat includes a rotatable D-shaped carousel, a mirror array including horizontal, elongated flat mirrors supported in a tiltable (e.g., louvered) arrangement on the carousel, and a mirror positioning system that is disposed next to the carousel and controls the tilt position of each mirror and a rotational position of the carousel to reflect light onto a solar receiver. The heliostats are arranged in a closely-spaced (e.g., square or hexagonal) pattern that both maximizes the effective ground coverage ratio of solar power harvesting system and facilitates the formation of service pathways that allow access to any of the heliostats in the array (e.g., by aligning the straight peripheral wall portions of adjacent carousels in parallel with each other).

19 Claims, 17 Drawing Sheets

(56) References Cited

U.S. PATENT DOCUMENTS

| | | | |
|---|---|---|---|
| 2,913,583 A * | 11/1959 | Regnier et al. | 250/203.4 |
| 3,861,379 A | 1/1975 | Anderson, Jr. | |
| 3,892,433 A | 7/1975 | Blake | |
| 3,905,352 A | 9/1975 | Jahn | |
| 3,924,604 A * | 12/1975 | Anderson | 126/606 |
| 4,068,653 A | 1/1978 | Bourdon et al. | |
| 4,109,638 A | 8/1978 | Matlock et al. | |
| 4,110,009 A | 8/1978 | Bunch | |
| 4,110,010 A | 8/1978 | Hilton | |
| 4,110,123 A | 8/1978 | Goetzberger et al. | |
| 4,117,682 A | 10/1978 | Smith | |
| 4,130,109 A | 12/1978 | Brueck | |
| 4,148,301 A | 4/1979 | Cluff | |
| 4,149,902 A | 4/1979 | Mauer et al. | |
| 4,153,813 A | 5/1979 | Blieden et al. | |
| 4,190,465 A | 2/1980 | Boling | |
| 4,193,819 A | 3/1980 | Wohlmut | |
| 4,209,231 A * | 6/1980 | Sayre | 359/853 |
| 4,218,114 A | 8/1980 | Bunch | |
| 4,261,335 A | 4/1981 | Balhorn | |
| 4,266,530 A | 5/1981 | Steadman | |
| 4,935,631 A | 6/1990 | Mosley et al. | |
| 5,180,441 A | 1/1993 | Cornwall et al. | |
| 5,274,497 A | 12/1993 | Casey | |
| 5,816,238 A | 10/1998 | Burns et al. | |
| 6,820,611 B2 | 11/2004 | Kinoshita | |
| 6,953,038 B1 * | 10/2005 | Nohrig | 126/694 |
| 7,192,146 B2 | 3/2007 | Gross et al. | |
| 7,677,241 B2 | 3/2010 | Hickerson | |
| 7,706,030 B2 | 4/2010 | Herloski et al. | |
| 8,354,628 B2 | 1/2013 | Schmaelzle et al. | |
| 2002/0179138 A1 * | 12/2002 | Lawheed | 136/246 |
| 2009/0038608 A1 | 2/2009 | Caldwell | |
| 2009/0126778 A1 | 5/2009 | Brounne et al. | |
| 2009/0205701 A1 | 8/2009 | Govaerts et al. | |
| 2009/0235974 A1 | 9/2009 | Mapel et al. | |
| 2010/0051016 A1 | 3/2010 | Ammar | |
| 2010/0252027 A1 * | 10/2010 | Sankrithi | 126/604 |
| 2011/0079267 A1 | 4/2011 | Raymond et al. | |
| 2012/0031467 A1 | 2/2012 | Schmaelzle et al. | |
| 2012/0192917 A1 | 8/2012 | Whitted et al. | |
| 2012/0325313 A1 * | 12/2012 | Cheung et al. | 136/259 |
| 2012/0325314 A1 | 12/2012 | Cheung et al. | |
| 2013/0047977 A1 | 2/2013 | Schmaelzle et al. | |

OTHER PUBLICATIONS

Jones, Dedger, et al. "Rotating Field Collector Subsystem Study and Evaluation", Sandia Contractor Report, 1982, 144 pages.

Kolb, Gregory J., et al. "Heliostat Cost Reduction Study", Sandia National Laboratory, Sandia Report SAND2007-3293, Jun. 2007, 159 pages.

Murphy, Thomas W., Jr. "Home photovoltaic systems for physicists", Physics Today, Jul. 2008, pp. 42-47.

Schramek, Philipp, et al. "Heliostats for maximum ground coverage", Energy 29 (2004), pp. 701-713.

Currie et al. "High-Efficiency Organic Solar Concentrators for Photovoltaics", Science 321 (2008), pp. 226-228.

Goetzberger et al. "Photovoltic materials, history, status and outlook", Materials Science and Engineering R 40 (2003), pp. 1-46.

Meyer, Thomas J. J. "Photon Transport in Fluorescent Solar Collectors", Thesis for the degree of Doctor of Philosophy, School of Engineering Sciences, University of Southampton, Jul. 2009, 197 pgs.

Smestad et al. "The thermodynamic limits of light concentrators", Solar Energy Materials 21 (1990), pp. 99-111.

Weber et al. "Luminescent greenhouse collector for solar radiation", Applied Optics, vol. 15, No. 10, Oct. 1976, pp. 2299-2300.

* cited by examiner

SOLAR TOWER SYSTEM WITH CAROUSEL HELIOSTATS

FIELD OF THE INVENTION

The present invention relates generally to an improvement in solar-power generation, and more particularly to an improved solar tower system (solar tower power plant).

BACKGROUND OF THE INVENTION

State of the art "solar tower" type solar-thermal energy systems (power plants) use large numbers (e.g., one thousand, or often more) of heliostats to reflect sunlight onto a tower-mounted (raised) solar receiver for conversion to usable electricity. Each heliostat typically includes an array of flat (or in slightly concave) mirrors that are maintained in a substantially upright position on a support post. A total reflective surface area per heliostat of greater than 100 m$^2$ is not uncommon, yet there is a trend observable in recent plants towards smaller, less wind-affected, heliostats with individual mirror areas as small as 1 m$^2$. Each mirror in the array (heliostat field) is pivoted (rotated) in two axes to track the apparent angular movement of the sun such that exiting (reflected) sunlight is constantly directed from the mirrors onto the raised solar receiver during daylight hours. A prominent example of a conventional solar tower system is the PS20 plant near Seville, Spain, which is built by Abengoa Solar from the same sunny European country. PS20 produces 20 MW of electricity from collecting sunlight from 1,255 heliostats, with each heliostat having a flat mirror surface area of 1,291 square feet. Across the Atlantic, heliostat development effort in the U.S. was initiated in 1975. Since then, solar tower plant (system) designers determined that it would be more economical to build larger heliostats which in turn will service plants with larger power output. These plants are very promising as a renewable power source because the LCoE (Levelized Cost of Energy) is near 6 to 7¢/kWhr, which falls somewhere between the U.S. retail rates of 10¢/kWhr and generation cost from fossil fuel plants of 3¢/kWhr. Cost subtotal of heliostats makes up 50% of the total cost of a solar tower plant, and current technology has not observably brought the cost of heliostats down below 100$/m$^2$, based on mirror surface area.

The solar tower industry has to overcome a number of technical challenges to bring future cost of heliostats to below $100/m$^2$, at which point experts believe that the solar tower technology will be competitive on the open market, especially if carbon-offset trading becomes the norm.

One impediment to reducing the cost of conventional heliostats is that the upright mirror arrangement experiences significant wind loading that must be accounted for by the mirror frame and support post. In windy conditions, the upright mirror arrangement effectively forms a large wind sail, and the resulting wind load forces are transmitted through the mirror support frame to the support post (which acts as a mast). Unless the support frame and support post structures are engineered to withstand worst case wind conditions, they risk damage or complete failure (collapse) under worst-case wind conditions. Thus, each heliostat's support frame and support post structures must either be extensively engineered, resulting in high design and production costs, or the heliostats will be subject to periodic wind-related damage, resulting in high repair and/or replacement costs.

Another problem facing conventional heliostats is that the upright mirror arrangement necessarily requires maintaining motors and/or complicated linkages at a significant distance above the ground in order to affect the necessary two-axis sun tracking operation. Periodic maintenance of the elevated location of the motors/linkages requires expensive lift equipment to enable access to the mirror array, and requires the maintenance personnel to work high above the ground and to move between the spaced-apart operational areas of the mirror array, thus increasing maintenance cost and chance of injury.

Another problem facing conventional upright mirror heliostats is that the heliostats must be positioned at a conservative offset spacing in order for all mirrors of conventional upright mirror arrangements to receive/reflect sunlight at most times during the year (i.e., in order to avoid shading/blocking of the mirrors). Depending on latitude and exact solar farm layout, a yearly aggregate of between approximately 30 and 80 percent more sunlight is available within the standard footprint of a standard upright mirror solar tower plant than is actually reflected by the heliostat mirrors. This "extra" (unreflected) sunlight is directed onto the bare ground between the heliostats that results from the conservative offset spacing, and the wasted "extra" sunlight is at a maximum when the noontime sun elevation angle is near its zenith (e.g., within one month of the summer solstice). Therefore, the ground coverage ratio (i.e., the ratio of reflected/captured sunlight to the total sunlight directed onto a given solar farm footprint) associated with conventional upright-mirror heliostats is necessarily small in a year-round aggregate, thus requiring a relatively large amount of land to produce a desired amount of solar power.

What is needed is an improved heliostat that addresses the cost, maintenance and ground coverage issues associated with conventional heliostats. What is also needed is a solar tower system that utilizes the improved heliostat in an efficient manner.

SUMMARY OF THE INVENTION

The present invention is directed to a solar tower system including an array of carousel-type heliostats that are individually controlled to reflecting sunlight onto a solar receiver. Each heliostat generally includes a D-shaped carousel (i.e., a rotatable platform) that is used to rotate a mirror array around a fixed central axis, and a mirror positioning system that periodically adjusts a position of the mirror array during daylight hours such that sunlight is continuously reflected from each carousel onto the solar receiver.

According to an aspect of the present invention, the mirror array of each heliostat 100 includes multiple elongated flat mirrors that are movably disposed in a low-profile, substantially horizontal plane on the carousel such that each mirror is rotatable into a corresponding tilt position. Because the mirror array is maintained in a low-profile horizontal plane, the heliostat of the present invention avoids the wind-loading issues associated with conventional heliostats using upright mirror arrangements, thereby greatly reducing engineering constraints and corresponding production costs of the heliostat. That is, because the mirror array is maintained in a low-profile horizontal plane, the carousel avoids the significant windload forces experienced by upright mirror arrangements, and can therefore be manufactured using construction techniques that are much less expensive that those required for upright mirror arrangements. In addition, the horizontal arrangement of the mirror array reduces the shadowing issues of upright mirror arrangements, thereby facilitating a much higher ground coverage ratio (i.e., closer spacing between adjacent heliostats) than that achievable using conventional upright-mirror heliostats.

According to another aspect of the present invention, the carousel of each heliostat includes a base having D-shaped peripheral edge structure that defines (surrounds) the carousel's footprint, and the mirror array is supported by and disposed inside the peripheral edge structure such that it can be rotated around the fixed central axis. For example, in one embodiment the D-shaped peripheral edge structure is implemented by a D-shaped peripheral wall made up of one or more wall sections that form a "C" shaped curved wall portion surrounding and defining a central region, and a straight wall portion connected across the two ends (edges) of the "C" shaped curved wall portion to enclose the central region. In alternative embodiments, the curved wall portion is formed short straight sections joined at angles to form the "C" shaped, or by a truncated ring-shaped or cylindrical wall structure. In one embodiment the D-shaped peripheral wall is rotatably supported on the underlying support surface by way of a passive movable support (e.g., wheels). The curved wall portion serves to support opposing ends of each of the elongated flat mirrors in a simply-supported manner such that each elongated flat mirror extends across the central region surrounded by the peripheral wall. Mounting the mirror array inside the peripheral wall in this manner further minimizes potential wind-loading forces by preventing wind from passing over the edges of the elongated flat mirrors, thereby preventing the mirrors from acting as "wings" to generate upward (lift) or downward forces on the carousel. In addition, mounting the mirror array such that all mirror support connections are located adjacent to the peripheral wall simplifies maintenance by allowing a maintenance person to access all of the mirror connections while standing in a single location by rotating the carousel. In an alternative embodiment, the D-shaped peripheral edge structure is formed by a series of mounts disposed in a D-pattern on a flat carousel base.

According to another aspect of the invention, the mirror positioning system of each heliostat includes a solar elevation tracking controller that adjusts the corresponding tilt angle of each elongated flat mirror in accordance with a determined sun elevation angle, whereby sunlight is continuously reflected from the mirror array onto the solar receiver. According to an embodiment of the present invention, each carousel further includes one or more tilt-angle control mechanisms that are disposed adjacent to the peripheral wall and operably connected to the mirror array, manipulates the tilt-angle control mechanism to adjust the corresponding tilt angle of each elongated flat mirror. Because the tilt-angle control mechanisms are located on the peripheral wall of the carousel, which is permanently maintained in the low-profile orientation (i.e., essentially at ground level), and because the mirror positioning system is located on the ground next to the carousel, maintenance of the heliostat is greatly simplified over that required for conventional heliostats using upright mirror arrangements (i.e., no special climbing equipment is needed, and a maintenance person can essentially stand in one place and rotate the carousel to access any connection that requires maintenance).

According to yet another aspect of the present invention, the mirror positioning system includes a solar azimuth tracking controller that adjusts the rotational position of the carousel around its central axis in accordance with a determined (e.g., detected or calculated) sun azimuth angle. Because the carousel is disposed to rotate in a circle and includes a peripheral wall, operation of the solar azimuth tracking controller in adjusting the rotational position of the carousel is simply achieved, for example, by applying a small radial force to the peripheral wall (or to a circular drive member fixedly connected to the peripheral wall) until the rotational position of the carousel is set such that sunlight directed onto the mirror array is reflected onto the solar receiver.

According to an embodiment of the present invention, each mirror of the mirror array of each heliostat is mounted on the carousel using a louver-type tilt mechanism that simultaneously rotates (tilts) and translates (laterally moves) each of the mirrors during adjustment for changes in the sun's elevation angle. In a specific embodiment, the louver-type tilt-mechanism includes a movable wall member that defines multiple slots and is moveable upward/downward relative to the peripheral wall, and each elongated flat mirror of the mirror array is rotatably connected to the peripheral wall by a first rod and slidably connected to the tilt-mechanism wall member by a second rod. Specifically, each end of the first rod is rotatably connected (e.g., by rotatable bearing structures) to corresponding opposing portions of the peripheral wall, and each end of the second rod is slidably engaged in a corresponding slot defined in opposing sections of the tilt-mechanism wall member. With this arrangement, movement of the movable member in an upward (first) direction relative to the peripheral wall, e.g., by way of a motor controlled in accordance with a determined (e.g., detected or calculated) sun elevation angle, causes the corresponding tilt angle of each elongated flat mirror to decrease, and movement of the moveable member relative to the peripheral wall causes the corresponding tilt angle of each elongated flat mirror to increase. With several strip-like elongated mirrors attached to the carousel using this "louver" arrangement, the present invention is expected to enable a significantly higher ground coverage ratio. That is, when the mirrors turn (tilt), the mirrors not only 'rotate' but also 'translate' significant distances, reconfiguring the shadowing geometry favorably. As a result, a solar tower power plant might achieve higher temperatures at the receiver for a given heliostat field size, or allow a smaller (easier to layout) heliostat field, providing the same receiver temperatures.

According to another embodiment of the present invention, the peripheral wall of the carousel of each heliostat is disposed on a passive movable support mechanism (e.g., wheels) that are disposed between the peripheral wall and the underlying support surface (e.g., ground). The wheels (or other movable support) facilitate the rotation of the carousel with low-resistance, thereby facilitating the use of a single motor in conjunction with the solar azimuth tracking controller to adjust the rotational position of each carousel around the central axis in accordance with a determined sun azimuth angle. In addition, the passive (i.e., non-powered) nature of the wheels minimizes the production and maintenance costs of the carousel. Moreover, by disposing the wheels below the peripheral wall, they are easily serviceable from perimeter of the carousel during maintenance. In one specific embodiment, a curved (e.g., circular) guide rail disposed on the ground below the peripheral wall, and the wheels are engaged with the curved guide such that the carousel is constrained to move along a circular or other curved path defined by the guide rail.

According to another embodiment of the present invention, the tilt-mechanism wall of each carousel is formed as a C- or D-shaped wall structure that is concentrically connected to the D-shaped peripheral wall. In a specific embodiment, the D-shaped peripheral wall includes a (first) continuously curved (e.g., truncated ring or cylinder) peripheral wall portion, and the tilt-mechanism wall includes a (second) continuously curved tilt-mechanism wall portion that is concentrically disposed and movably supported on an outside surface of the continuously curved peripheral wall portion. By forming the peripheral wall and the tilt-mechanism wall of each heliostat with concentric, continuously curved wall portions that rotate around an associated central axis, the resulting carousel shape allows arranging multiple heliostats in a closely spaced relationship, thereby facilitating a much higher ground coverage ratio than that achievable using conventional upright-mirror heliostats. Moreover, the D-shape of the continuously curved peripheral wall portion and the continuously curved tilt-mechanism wall portion facilitate operating both structures from a single location because the curved walls can be formed to remain a substantially fixed distance from the mirror positioning system for all rotational positions of the carousel. Further, by combining this concentric arrangement with louvered mirrors (i.e., as described above), the resulting carousel facilitates simultaneous tilting of all elongated mirrors in the mirror array with one actuation.

According to another specific embodiment, each carousel is constructed such that the concentric relative movement (i.e., upward or downward) of the tilt-mechanism wall relative to the peripheral wall to implement the louver-type mirror adjustment is generated by concentric rotation of the tilt-mechanism wall around the peripheral wall, and the mirror positioning system is constructed to perform independent rotation of tilt-mechanism wall and peripheral wall. In an exemplary specific embodiment, rollers are disposed on a curved peripheral wall and ramp-like wedge structures are disposed on a curved tilt-mechanism wall, and the tilt-mechanism wall is concentrically mounted on the peripheral wall such that the ramp-like wedge structures contact the rollers. Relative movement (i.e., upward or downward) of the tilt-mechanism wall to generate the louver-type mirror tilt operation mentioned above is performed by causing the mirror positioning system to rotate the tilt-mechanism wall relative to the peripheral wall, causing the ramp-like wedge structures to ride on the rollers such that the tilt-mechanism wall is raised or lowered relative to the peripheral wall. This arrangement facilitates both carousel rotation and mirror tilt-angle control using two motors that respectively engage the tilt-mechanism wall and the peripheral wall by way of respective gear trains housed in a single motor box. Moreover, the D-type carousel shape and single motor box arrangement facilitates arranging multiple heliostats in a closely spaced (e.g., square or hexagonal) relationship, thereby facilitating an extremely high ground coverage ratio than that achievable using conventional upright-mirror heliostats.

In accordance with yet another aspect of the present invention, the heliostats are arranged in a selected closely-spaced pattern that both maximizes the effective ground coverage ratio of solar power harvesting system and facilitates the formation of service pathways that allow access to any of the heliostats in the array (e.g., when the straight wall portions of adjacent carousels are aligned in parallel with each other). In one embodiment, the heliostats are arranged in a closely-spaced square pattern in which the heliostats are aligned in parallel rows and columns. To facilitate the formation of service pathways between, e.g., the parallel rows, the mirror positioning systems of all heliostats in adjacent pairs of rows are disposed in open regions located between the heliostats. With this arrangement, when the mirror positioning system of each heliostat rotates its associated carousel such that all of the straight perimeter wall portions are aligned in parallel and faces away from the mirror positioning systems, a service pathway is formed between the parallel rows for allowing a service vehicle to access any of the heliostats. In an alternative embodiment, the heliostats are arranged in a closely-spaced hexagonal pattern in which the heliostats are aligned in parallel offset columns. To facilitate the formation of service pathways between, e.g., the parallel offset columns, the mirror positioning systems of all heliostats in adjacent pairs of offset columns are disposed in open regions located between the heliostats, and the carousels are rotated such that all of the straight perimeter wall portions are aligned in parallel and faces away from the mirror positioning systems.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improved solar tower system. The following description is presented to enable one of ordinary skill in the art to make and use the invention as provided in the context of a particular application and its requirements. As used herein, directional terms such as "above", "upper", "upward", "below", "lower", "downward", "front", "rear", "vertical", "vertically", "horizontal", "horizontally", "rows" and "columns" are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
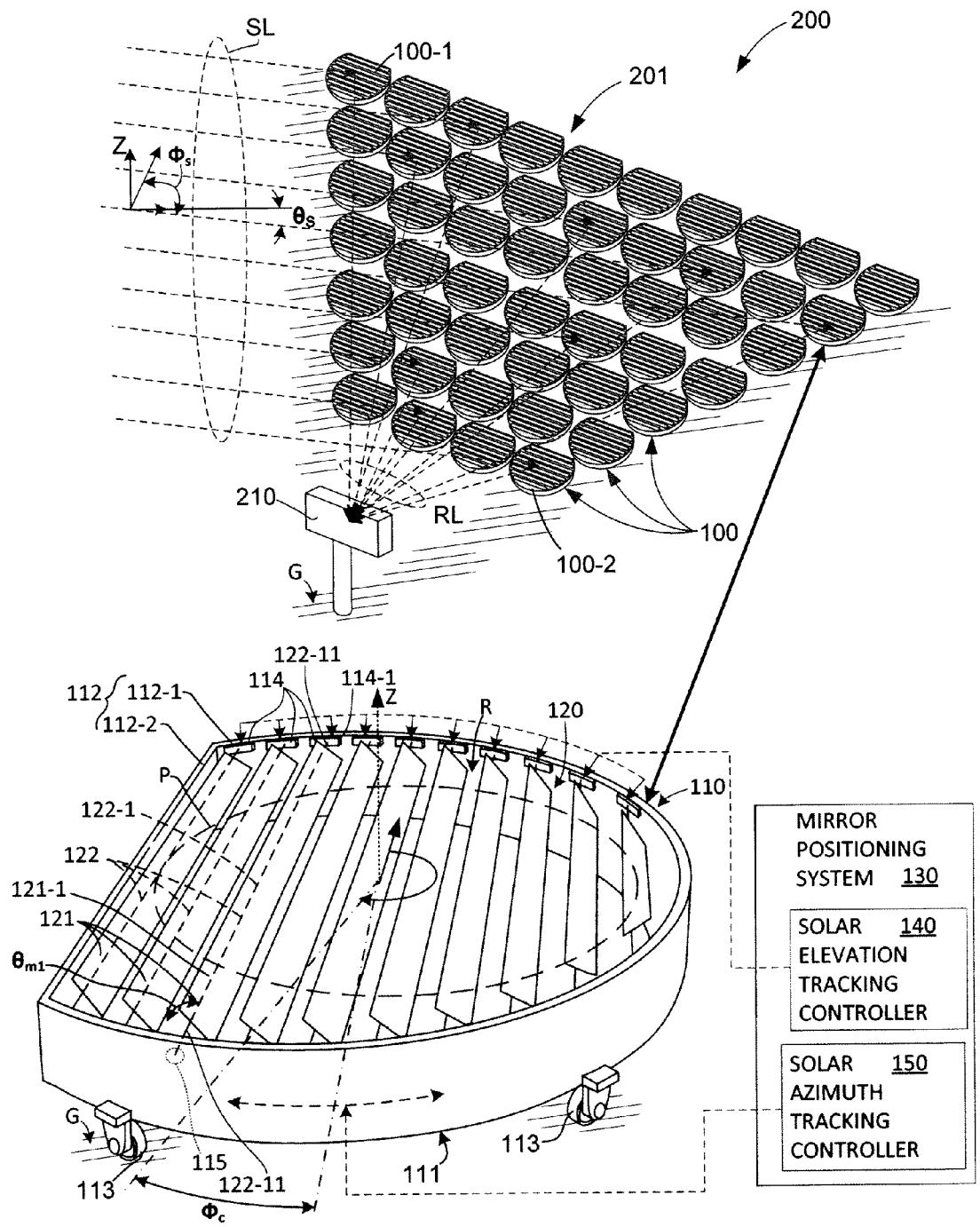
FIG. 1 is a top front perspective view showing a solar tower system according to a simplified embodiment of the present invention.

FIG. 1 is a simplified perspective diagram showing a portion of a solar tower system 200 including an array 201 of carousel-type heliostats 100 disposed in accordance with a simplified embodiment of the present invention. Similar to conventional solar tower arrangements, system 200 includes a raised solar receiver 210 that is disposed on a support surface (e.g., level ground G) and positioned to receive reflected sunlight RL from all heliostats 100 disposed in array 201 on the support surface below raised solar receiver 210. Those skilled in the art with recognize that the number of heliostats 100 in array 201 is arbitrarily selected for descriptive purposes, and that the actual number of heliostats in a practical setting is determined by the size of each heliostat and the amount of energy required.

Referring to the enlarged exemplary heliostat 100 shown at the bottom of FIG. 1, according to an aspect of the present invention, each heliostat 100 in array 201 generally includes a carousel 110, which is rotatable around a corresponding fixed central axis Z relative to the underlying support surface (e.g., ground G), and an associated mirror positioning system 130 that is fixedly disposed on ground G next to carousel 110. Each carousel 110 generally serves the function of providing a substantially passive movable support (rotatable platform) for an associated mirror array 120, and each mirror positioning system 130 serves the function of periodically adjusting rotational and tilt angle positions of its associated mirror array 120 during daylight hours such that incident sunlight SL is continuously reflected from all of the mirror arrays 120 (i.e., from all heliostats 100) toward solar receiver 210. That is, the rotational and tilt angle positions of the mirrors disposed in each mirror array 120 are controlled independent separately by the corresponding mirror positioning system 130, and the reflected sunlight RL is continuously directed onto solar receiver 210. Details of the specific operations associated with these functions are described below.

Each mirror array 120 includes multiple elongated (e.g., rectangular or trapezoidal) flat mirrors 121 that are disposed in a parallel arrangement on an associated carousel 110 in a low-profile substantially horizontal plane P (i.e., such that mirror array 120 is contained within a vertical extend of approximately 1 meter or substantially less at all times). Each mirror (e.g., mirror 121-1) is separately movable (i.e., tiltable) relative to associated carousel 110 into a corresponding tilt angle $\theta_{m1}$ that is determined and controlled by associated mirror positioning system 130. Embodiments describing exemplary connections and mechanisms associated with tilt angle adjustments of the mirrors are set forth below. Because the mirror array 120 is maintained in a low-profile horizontal plane P, heliostat 100 avoids the wind-loading issues associated with conventional upright-mirror heliostats, thereby greatly reducing engineering constraints and corresponding production costs of heliostat 100. That is, because mirror array 120 is arranged in a low-profile horizontal plane that is parallel to the wind direction, not perpendicular as experienced by upright-mirror heliostats, carousel 110 avoids the significant windload forces experienced by the conventional upright mirror arrangements, and can therefore be manufactured using construction techniques that are much less expensive that those required for upright mirror arrangements. In addition, the low-profile, horizontal arrangement of mirror array 120 essentially eliminates the shadowing issues of upright mirror arrangements (i.e., because horizontal flat structures cast little or no shadow under any lighting conditions). As such, heliostat 100 facilitates a much higher ground coverage ratio (i.e., closer spacing between adjacent heliostats) than is achievable using conventional upright-mirror heliostats.

According to an embodiment of the present invention, carousel 110 includes a D-shaped base 111 having a peripheral wall (edge structure) 112 that entirely surrounds mirror array 120. In the illustrated embodiment, base 111 is rotatably disposed on support surface G by way of three or more wheels 113 (two shown) or another passive movable support that allows peripheral wall 112 to rotate around central axis Z. Peripheral wall 112 includes a curved wall portion 112-1 that defines and surrounds a central region R, and a straight wall portion 112-2 connected across the two ends (edges) of curved wall portion 112-1. Curved wall portion 112-1 extends from a lower edge disposed on the support surface (or maintained a distance above the support surface) to an upper edge that is disposed at substantially the same height or above mirror array 120. Mounting mirror array 120 inside peripheral wall 112 in this manner further minimizes potential wind-loading forces by preventing wind from passing over the edges of elongated flat mirrors 121-1 to 121-4, thereby preventing an airfoil-type (wing-like) upward (lift) or downward force on carousel 110 when a prevailing wind is directed over the leading edge of one or more of mirrors 121-1 to 121-4. However, as described below with reference to FIGS. 14(A) and 14(B), benefits of the present invention may be achieved using a carousel base that omits a peripheral wall structure, although this would reduce the windload preventing benefits of a peripheral wall. The main advantage of the "D-shape" of peripheral wall 112 is set forth below, for example, with reference to FIGS. 9-13.

The peripheral edge structure (e.g., peripheral wall 112) of the present invention is not limited to the arrangements depicted by the exemplary embodiments described herein, so long as it has a generally D-shaped footprint and adequately supports the outer edge of mirror array 120. That is, although curved wall portion 112-1 is depicted in FIG. 1 as including being continuously curved, the peripheral wall may be formed using multiple short straight portions forming a generally curved shape, such as the embodiment described below with reference to FIGS. 5(A) and 5(B). As such, the present invention is not intended to be limited to the specific D-shaped peripheral wall arrangements disclosed herein unless otherwise specified in the claims.

According to another aspect of the present invention, elongated flat mirrors 121 of each mirror array 120 are tiltably connected to corresponding sections of curved peripheral wall portion 112-1 on each heliostat 100. In a preferred embodiment, each elongated mirror 121 is simply supported between corresponding sections of curved peripheral wall portion 112-1 on each heliostat 100, e.g., by way of rods 122. For example, as shown in FIG. 1, a back (non-reflective) surface of elongated mirror 121-1 is fixedly connected to rod 122-1, and mirror 121-1 is simply supported by way of connections between first end 122-11 of rod 122-1 and a first section of curved peripheral wall portion 112-1, and between second end 122-12 of rod 122-1 and a second section of curved peripheral wall portion 112-1. The remaining mirrors 121 of mirror array 120 are similarly simply supported by way of rods 122 that are substantially parallel to rod 122-1. Mounting mirror array 120 such that all mirror support connections are located adjacent to peripheral wall 112 simplifies maintenance of carousel 110 by allowing a maintenance person to service all of the mirror connections while standing in a single location next to peripheral wall 112 (i.e., the maintenance person can access any mirror support connection needing service simply by rotating carousel 110 until the mirror support connection is at his/her location). Further, no special climbing equipment is needed to service the mirrors because all of the connections are located at essentially ground level.

According to yet another aspect of the present invention, the mirror positioning system 130 of each heliostat 100 includes a solar elevation tracking controller 140 that adjusts the corresponding tilt angle of each elongated flat mirror 121 in accordance with a determined sun elevation angle $\theta_s$, and solar azimuth tracking controller 150 that adjusts the rotational position $\phi_c$ of carousel 110 around its central axis Z in accordance with a determined sun azimuth angle $\phi_s$, whereby sunlight SL is continuously reflected from the mirror array 120 onto the solar receiver 210. Note that the mirror positioning system 130 of each heliostat 100 typically operates independently from the mirror positioning systems 130 of all other heliostats 100 in array 201 because unique mirror tilt and rotational angles must be applied to each heliostat 100 based on its position in array 201. For example, referring to the top of FIG. 1, a steeper mirror tilt angle and a more counterclockwise rotational angle must be applied to heliostat 100-1 relative to the mirror tilt angle and rotation angle of heliostat 100-2 in order for both of these heliostats to reflect parallel sunlight beams SL onto raised solar receiver 210.

In one embodiment, the carousel 110 of each heliostat 100 includes one or more tilt-angle control mechanisms 114 that are disposed adjacent to the peripheral wall 112 and operably connected to mirror array 120. Tilt-angle control mechanism 114 operates in conjunction with mirror positioning system 130 to adjust the corresponding tilt angle of elongated flat mirrors 121. In one embodiment, tilt-angle control mechanism 114 includes a single passive structure that is mounted on peripheral wall 112 and operably connected to both mirror array 120 and mirror positioning system 130 such that a mechanical force supplied by mirror positioning system 130 is transferred to mirror array 120, thereby simultaneously adjusting all of mirrors 121 into a desired tilt angle (e.g., tilt-angle control mechanism 114-1 rotates mirror 121-1 around rod 122-1 into a desired tilt angle $\theta_{m1}$). Alternatively, tilt-angle control mechanism 114 includes multiple active mechanisms (e.g., motors) and associated linkages that are mounted on peripheral wall 112 and are respectively operably connected to mirrors 121. In this embodiment, the active mechanisms receive control signals from mirror positioning system 130, and generate appropriate rotational forces that adjust mirrors 121 into the desired tilt angle (e.g., by rotating rod 122-1 to adjust mirror 121-1 into desired tilt angle $\theta_{m1}$). Because tilt-angle control mechanism 114 is mounted on or otherwise located adjacent to peripheral wall 112, which is permanently maintained in the low-profile orientation (i.e., essentially at ground level), and because mirror positioning system 130 is located on ground G next to carousel 110, maintenance of the tilt-angle functions of heliostat 100 is greatly simplified over that required for conventional heliostats using upright mirror arrangements (i.e., no special climbing equipment is needed, and a maintenance person can essentially stand in one place and rotate the carousel 110 to access any connection that requires maintenance).

In accordance with an aspect of the present invention, each solar elevation tracking controller 140 includes various operational components (e.g., sun position sensors, processor/control signal generators, and motors) that generate and transmit associated control forces/signals that cause tilt-angle control mechanism 114 to adjust the corresponding tilt angle of each elongated flat mirror (e.g., tilt angle $\theta_{m1}$ of mirror 121-1) in accordance with a detected or otherwise determined sun elevation angle $\theta_s$. Because solar elevation tracking controller 140 is disposed on the ground adjacent to carousel 110 and tilt-angle control mechanism 114 is disposed adjacent to peripheral wall 112, transmission of the associated control forces/signals from solar elevation tracking controller 140 to tilt-angle control mechanism 114 is greatly simplified, and maintenance of solar elevation tracking controller 140 and all associated connections is easily performed from a single ground-level location.

Similarly, solar azimuth tracking controller 150 includes various operational components (e.g., sun position sensors, processor/control signal generators, and motors) that generate and transmit associated control forces that cause rotation of mirror array 120 around central axis Z to adjust the rotational position $\phi_c$ of mirror array 120 relative to the determined sun azimuth angle $\phi_s$. Because carousel 110 is disposed to rotate mirror array 120 in a circle and because the outer perimeter of mirror array is essentially disposed on peripheral wall 112, operation of the solar azimuth tracking controller 150 in adjusting the rotational position $\phi_c$ of the carousel 110 is simply achieved, for example, by applying a small radial force to peripheral wall 112 (or to a circular drive member connected to peripheral wall 112). Moreover, maintenance of solar azimuth tracking controller 150 and all associated connections is easily performed from a single ground-level location.

Additional features and alternative embodiments will now be described with reference to several alternative and specific embodiments.

Figure 2:
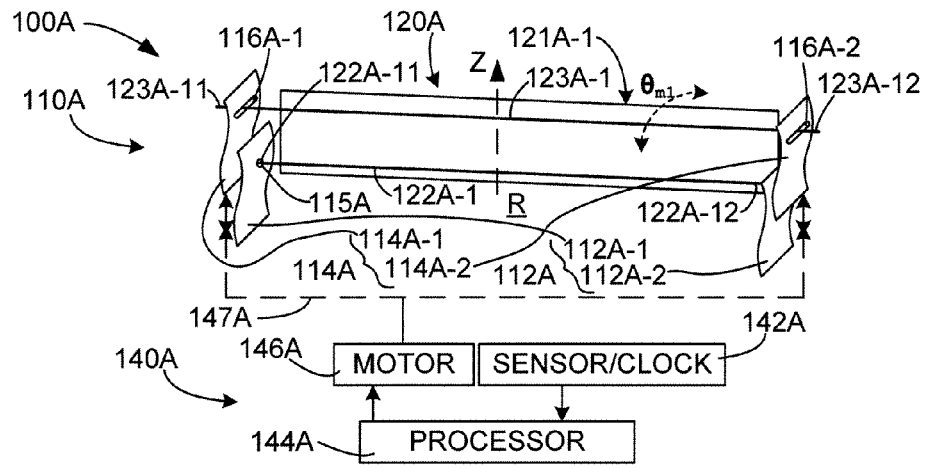
FIG. 2 is a simplified side elevation view showing a roundabout platform support mechanism utilized in accordance with an embodiment of the present invention.

FIG. 2 is a partial top side perspective view showing a heliostat 100A according to a first alternative embodiment of the present invention in which each mirror is attached to a carousel 110A by way of a simplified louver-type tilt mechanism 114A that simultaneously rotates (tilts) and translates (laterally moves) each of the mirrors during adjustment for changes in the sun's elevation angle. Carousel 110A includes a peripheral wall 112A that defines a central region (footprint) R, and a mirror array 120A including a plurality of elongated mirrors that rotate around a central axis Z. Note that, for explanatory purposes, only small portions 112A-1 and 112A-2 of peripheral wall 112A and one mirror 121A-1 are shown in FIG. 2, but that the structure and arrangement of peripheral wall 112A and mirror array 120A are otherwise similar to those of the generalized embodiment shown in FIG. 1.

Referring to the lower portion of FIG. 2, solar elevation tracking controller 140A includes a device (e.g., one or more sensors or a clock and geo-position data table circuit) 142A for detecting or otherwise determining the sun's elevation angle at a given moment, a processor 144A for generating control signals in response to the determined elevation angle, and a motor 146A that is operably coupled by an associated linkage mechanism to transmit a lifting force (indicated by arrow 147A) to louver-type tilt mechanism 114A in responsive to the control signals generated by processor 144A. Those skilled in the art will recognize that the simplified component description of specific solar elevation tracking controller 140A shown in FIG. 2 is merely exemplary, and that several alternative arrangements may be utilized to achieve the louver operations described herein.

In accordance with an aspect of the present embodiment, simplified louver-type tilt-mechanism 114A includes movable members 114A-1 and 114A-2 that are movably disposed adjacent to peripheral wall portions 112A-1 and 112A-2, respectively, and that define slots 116A-1 and 116A-2, respectively. As indicated by the two-headed arrows at the lower end of members 114A-1 and 114A-2, louver-type tilt-mechanism 114A is moveable in the Z-axis direction (i.e., upward and downward) relative to the peripheral wall 112A in accordance with a force 147A generated by motor 146A.

In accordance with another aspect of the present embodiment, mirror 121A-1 is rotatably connected to peripheral wall 112A by a first rod 122A-1, and is slidably connected to tilt-mechanism 114A by a second rod 123A-1. Specifically, opposing ends 122A-11 and 122A-12 of rod 122A-1 are respectively rotatably connected (e.g., by rotatable bearing structure 115A) to corresponding opposing peripheral wall portions 112A-1 and 112A-2, and opposing ends 123A-11 and 123A-12 of rod 123A-1 are respectively slidably engaged in slots 116A-1 and 116A-2. With this arrangement, mirror 121A-1 is constrained to rotate (pivot) around rod 122A-1 when tilt-mechanism 114A is moved upward or downward relative to peripheral wall 112A during a mirror tilt operation. In addition, as mirror 121A-1 rotates (pivots) around rod 122A-1, the upward or downward movement of tilt-mechanism 114A causes opposing ends 123A-11 and 123A-12 of rod 123A-1 to slide along slots 116A-1 and 116A-2, respectively, thereby causing mirror 121A-1 to tilt.

Figure 3A:
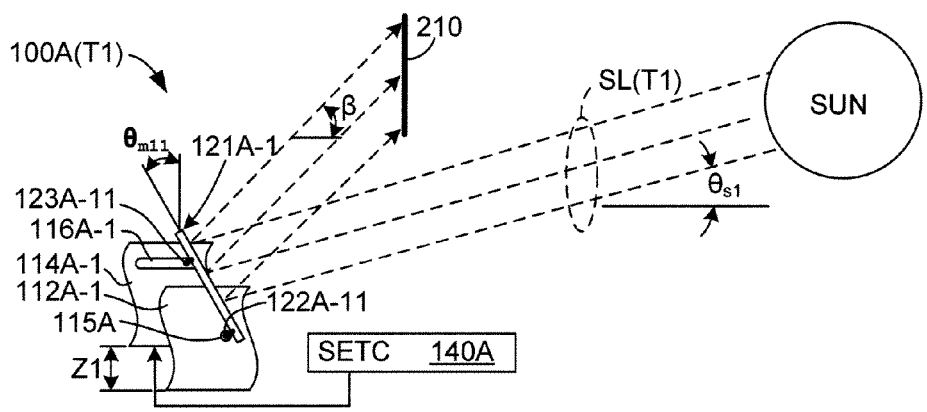
FIGS. 3(A) and 3(B) are top plan views showing rotation of roundabout platform support mechanism of FIG. 2 by an exemplary solar azimuth tracking controller according to an exemplary embodiment of the present invention.
Figure 3B:
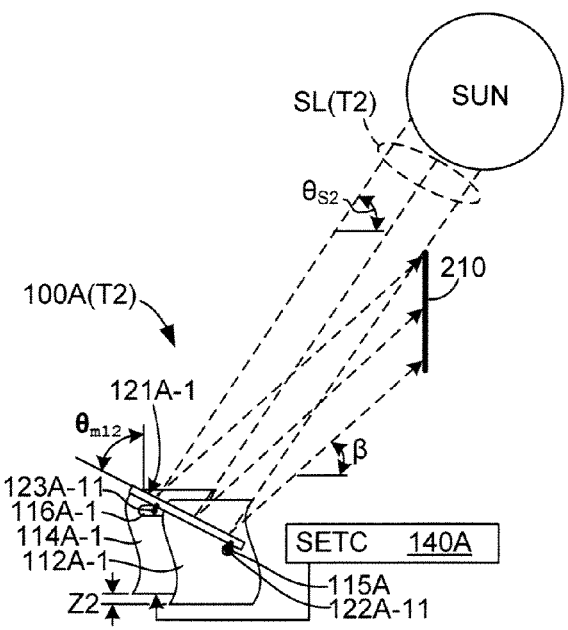

FIGS. 3(A) and 3(B) are partial side elevation views showing heliostat 100A during a mirror adjustment operation utilizing louver-type tilt-mechanism described above with reference to FIG. 2. These simplified figures show a portion of heliostat 100A including peripheral wall portion 112A-1, tilt-mechanism movable member 114A-1, and mirror 121A-1 during the mirror adjustment operation.

FIG. 3(A) shows heliostat 100A(T1) (i.e., heliostat 100A at dawn or in the evening) when the sun's elevation angle $\theta_{s1}$, is relatively shallow due to the sun's low position on the horizon. To compensate for the determined sun elevation angle $\theta_1$, solar elevation tracking controller (SETC) applies a control force to movable member 114A-1 such that movable member 114A-1 assumes a (first) raised position relative to peripheral wall portion 112A-1 (indicated by arrow Z1) in accordance with a determined sun elevation angle $\theta_{s1}$. The raised position of movable member 114A-1 positions rod end 123A-11 at the front (right) end of slot 116A-1, which causes mirror 121A-1 to rotate (pivot) around rod end 122A-11 (which is held by bearing 115A) into a relatively upright tilt angle $\theta_{m11}$, whereby mirror 121A-1 is properly positioned to reflect sunlight rays SL(T1) at a predetermined reflection angle β onto raised solar receiver 210.

FIG. 3(B) shows heliostat 100A(T2) (i.e., heliostat 100A during midday hours) after the sun's elevation angle $\theta_{s2}$ has increased to a maximum elevation. To track the elevation angle change from angle $\theta_{s1}$ (see FIG. 3(A)) to angle $\theta_{s2}$, solar elevation tracking controller 140A continuously or periodically generates control signals that cause mirror 121A-1 to gradually tilt backward into pivot angle $\theta_{m12}$ in order to continuously reflect sunlight rays SL(T2) at predetermined reflection angle β onto raised solar receiver 210. In particular, solar elevation tracking controller (SETC) applies a continuous series of control forces to movable member 114A-1 such that movable member 114A-1 gradually moves downward from the raised position relative to peripheral wall portion 112A-1 (indicated by arrow Z1 in FIG. 3(A)) to the lowered position indicated by arrow Z2 in FIG. 3(B) in accordance with the changing sun elevation angle. The gradual decline of movable member 114A-1 causes rod end 123A-11 to slide from the front (right) end of slot 116A-1 toward the rear (left) end of slot 116A-1, which causes mirror 121A-1 to rotate (pivot) in a counterclockwise direction around rod end 122A-11/bearing 115A into the relatively flat tilt angle $\theta_{m12}$, whereby mirror 121A-1 is properly positioned to reflect sunlight rays SL(T2) at a predetermined reflection angle β onto raised solar receiver 210.

Subsequently, during the afternoon hours as the sun's elevation angle again decreases, the solar elevation tracking controller generates control signals that cause mirror 121A-1 to tilt downward toward pivot angle $\theta_{m11}$. With several strip-like elongated mirrors attached to the carousel 110A using this "louver" arrangement, the present invention is expected to enable a significantly higher ground coverage ratio. That is, when the mirrors turn (tilt), the mirrors not only 'rotate' but also 'translate' significant distances, reconfiguring the shadowing geometry favorably. As a result, a solar tower plant might achieve higher temperatures at the receiver for a given heliostat field size, or allow a smaller (easier to layout) heliostat field, providing the same receiver temperatures.

Figure 4:
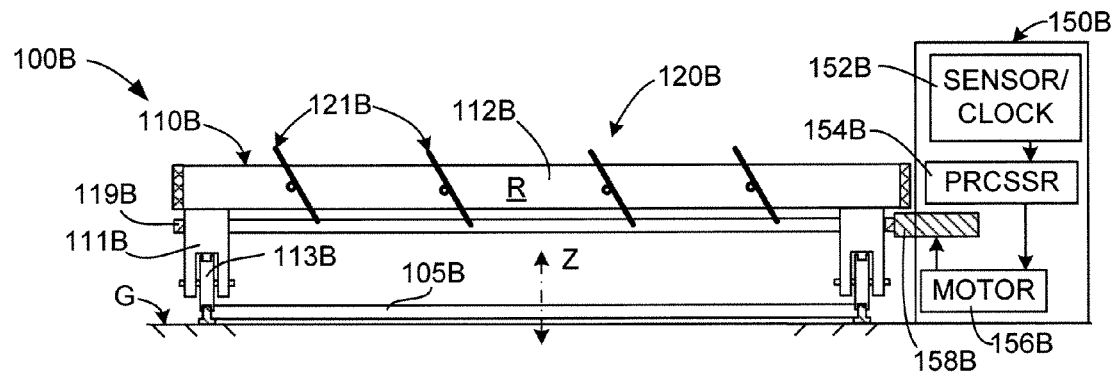
FIG. 4 is a simplified top side perspective view showing a solar elevation tracking controller according to an exemplary embodiment of the present invention.

FIG. 4 is a simplified side elevation view showing a simplified heliostat 100B including a roundabout-type carousel 110B and an associated solar azimuth tracking controller 150B in accordance with another embodiment of the present invention. Carousel 110B includes a peripheral wall 112B that defines a central region R, and a mirror array 120B including elongated flat mirrors 121B that movably secured to peripheral wall 112B. Note that the structure and arrangement of peripheral wall 112B and mirror array 120B may be implemented using any of the mechanisms described herein.

In accordance with the present embodiment, peripheral wall 112B is disposed by way of a base structure 111B on a passive movable support mechanism (e.g., wheels) 113B that are disposed between the peripheral wall 112B and curved guide (rails) 105B. Base structure 111B is constructed in a manner similar to well-known roundabout platform arrangements utilized, for example, in the railroad industry, and is movably supported by wheels 113B, which are engaged with curved guide 105B (e.g., a circular or semi-circular rail or track whose center coincides with axis Z), which in turn is fixedly attached to an underlying support surface (e.g., ground G). This arrangement constrains carousel 110B to rotate around centrally located axis Z.

In the exemplary embodiment shown in FIG. 4, solar azimuth tracking controller 150B includes a device (e.g., a sensor or a clock and sun position table circuit) 152B for detecting or otherwise determining the sun's azimuth angle at a given moment, a processor 154B for generating generate control signals in accordance with the output of sensor 152B, and motor 156B that is operably connected by way of a drive wheel/gear 158B to a drive ring/rail 119B that is fixedly connected to peripheral wall 112B such that motor 156B causes carousel 110B to rotate on circular track 105B around axis Z (shown in end view) in accordance with the control signals generated by processor 154B. Those skilled in the art will recognize that the specific base structure arrangement shown in FIG. 4 is merely exemplary, and that several alternative arrangements may be utilized to achieve functions of constraining a carousel to rotate as described herein.

Figure 5A:
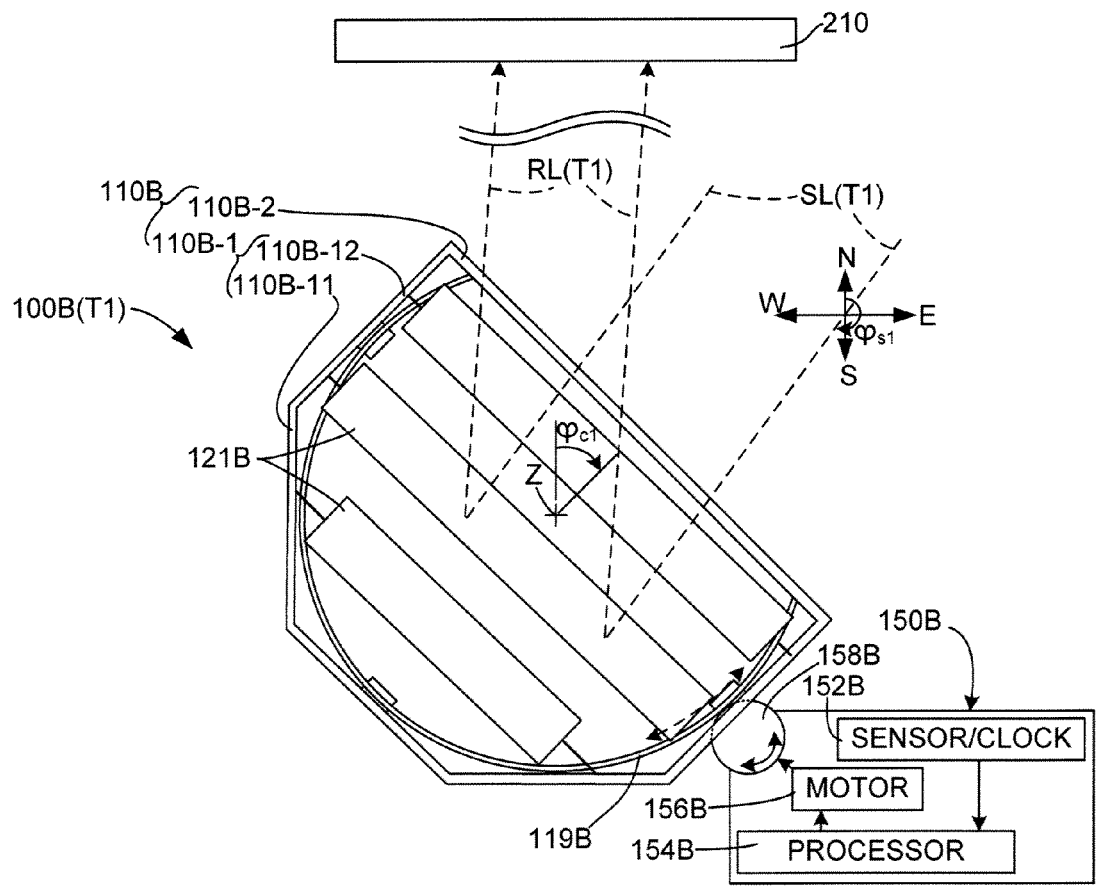
FIGS. 5(A) and 5(B) are side elevation views showing pivoting of flat mirrors of the system of FIG. 1 by an solar elevation tracking system according to an exemplary embodiment of the present invention.
Figure 5B:
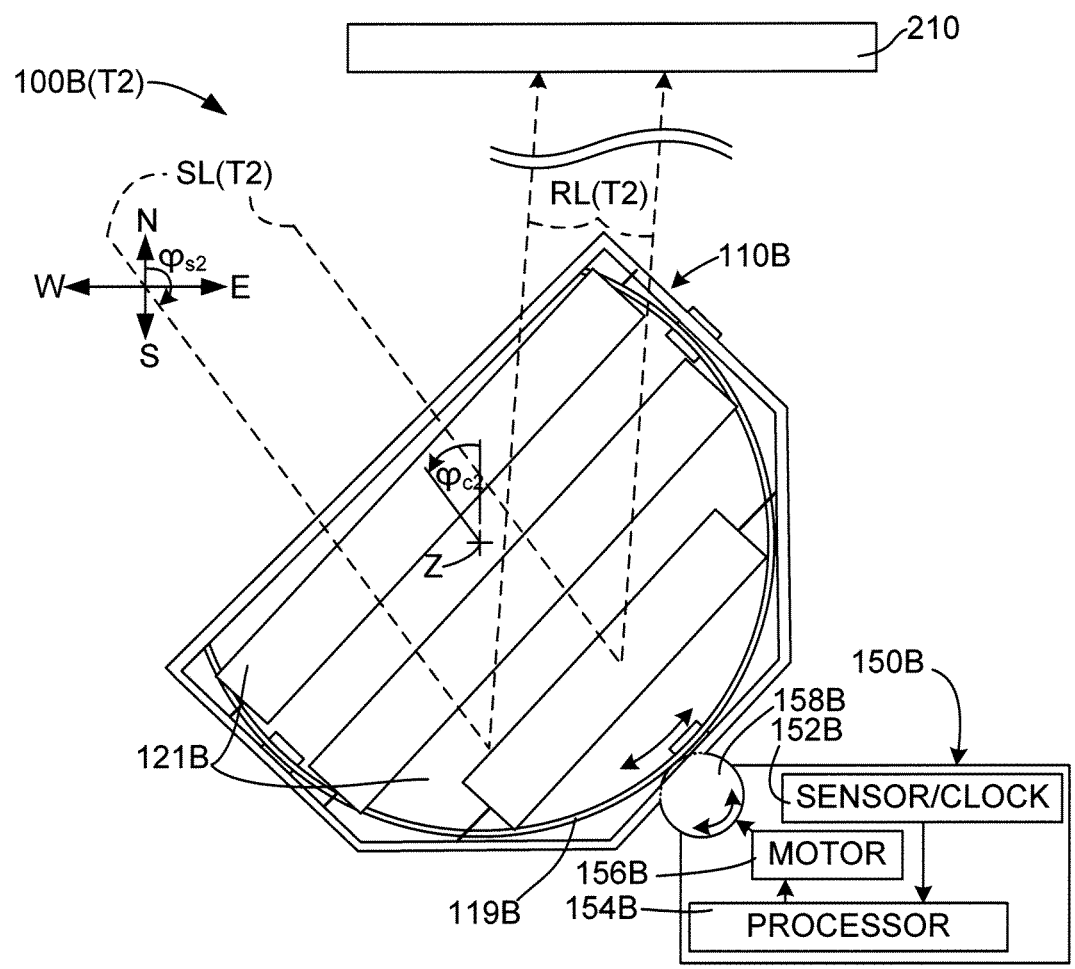

FIGS. 5(A) and 5(B) are simplified top views showing a portion of system 100B during morning and evening time periods, respectively. FIG. 5(A) shows system 100B(T1) (i.e., system 100B at a time T1, e.g., at sunrise) when the sun is positioned such that the azimuth angle $\phi_{s1}$ of sunlight rays SL(T1) are directed in a generally northeast-to-southwest direction. At this time, solar azimuth tracking controller 150B has caused carousel 110B to rotate around axis Z into rotational position $\phi_{c1}$ such that each mirror 121B faces northeast toward the rising sun, and in particular such that reflected sunlight rays RL(T1) are directed by mirrors 121B onto receiver 210. During the day, as the sun's relative position changes from northeast to northwest, solar azimuth tracking controller 150B causes carousel 110B to rotate accordingly such that sunlight is continuously reflected toward receiver 210. FIG. 5(B) shows system 100B(T2) (i.e., system 100B at a time T2, e.g., in the evening) when the sun is positioned such that the azimuth angle $\phi_{s2}$ of sunlight rays SL(T2) is directed in a generally northwest-to-southeast direction, and solar azimuth tracking controller 150B positions carousel 110B such that mirrors 121B face northwest toward the setting sun with reflected sunlight rays RL(T2) directed onto receiver 210.

By providing carousel 110B with a suitable low-resistance movable support (e.g., wheels 113B, shown in FIG. 4), the present embodiment facilitates rotation of carousel 110B around central axis Z using a simple, low cost azimuth tracking controller that requires minimal energy, and facilitates the use of a single low-energy motor (i.e., motor 156B) to adjust rotational position $\phi_c$ of carousel 110B around central axis Z in accordance with a determined sun azimuth angle $\phi_s$, thereby facilitating much higher energy output than is possible using conventional heliostat arrangements while maintaining low system costs. In addition, the passive (i.e., non-powered) nature of wheels 113B minimizes the production and maintenance costs of carousel 110B. Moreover, by disposing wheels 113B below peripheral wall 112B (as shown in FIG. 4), they are easily serviceable from perimeter of the carousel during maintenance. Those skilled in the art will recognize that solar azimuth tracking controller 150B is merely exemplary, and that several alternative arrangements may be utilized to achieve functions of that solar azimuth tracking controllers described herein.

Figure 6A:
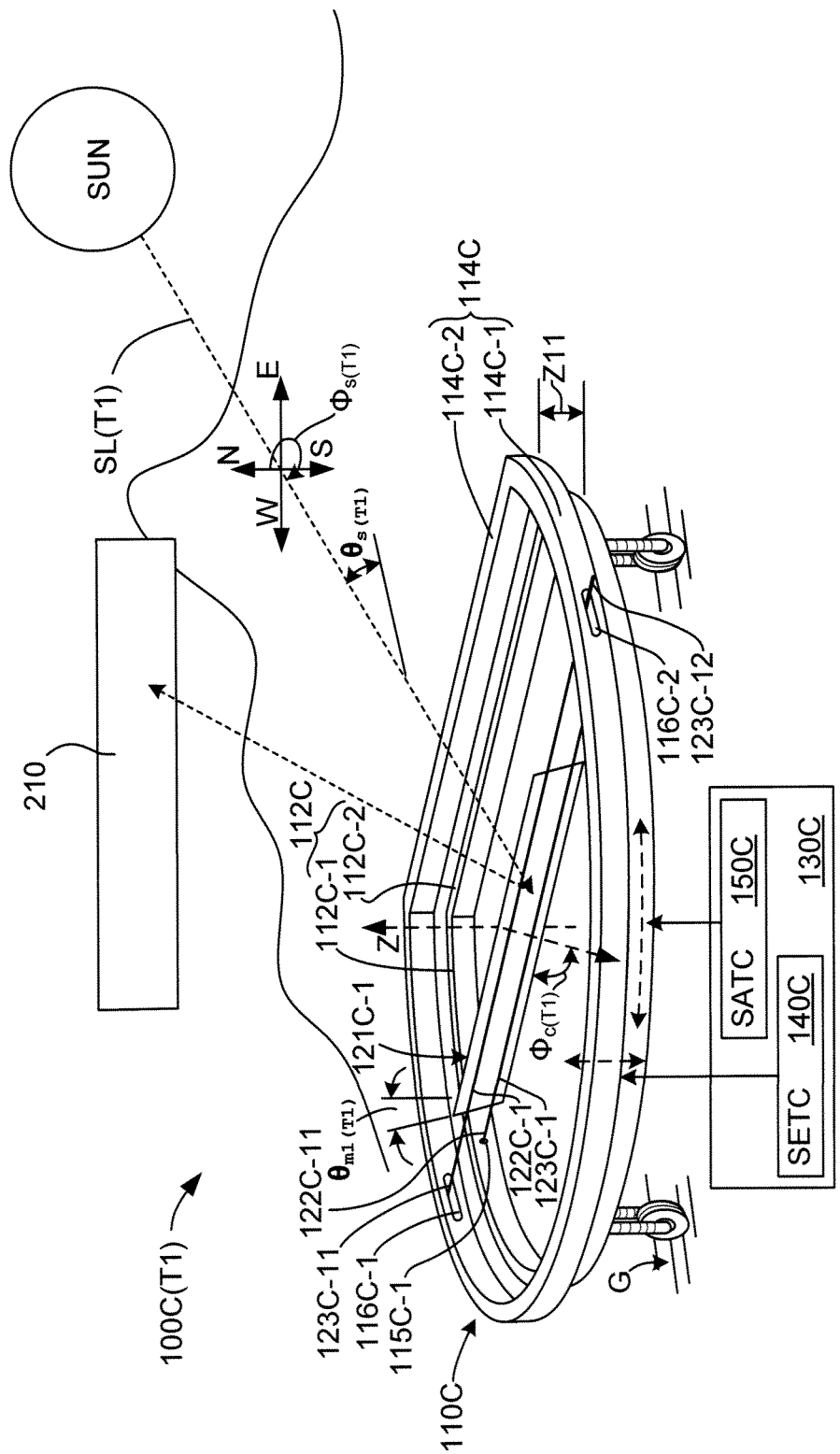
FIGS. 6(A), 6(B) and 6(C) are simplified top side perspective views showing a simplified concentric ring heliostat utilized in accordance with another exemplary embodiment of the present invention.
Figure 6B:
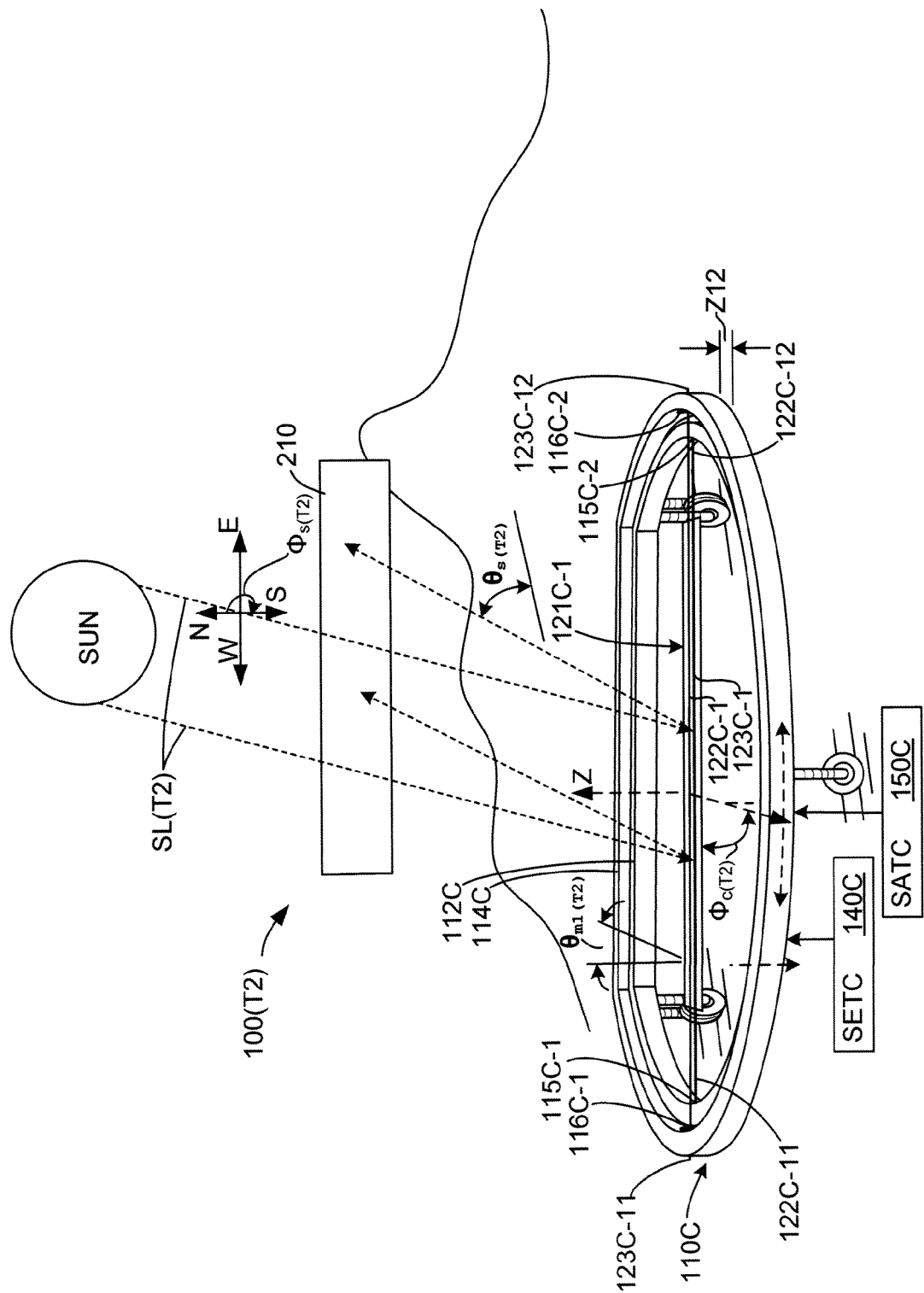
Figure 6C:
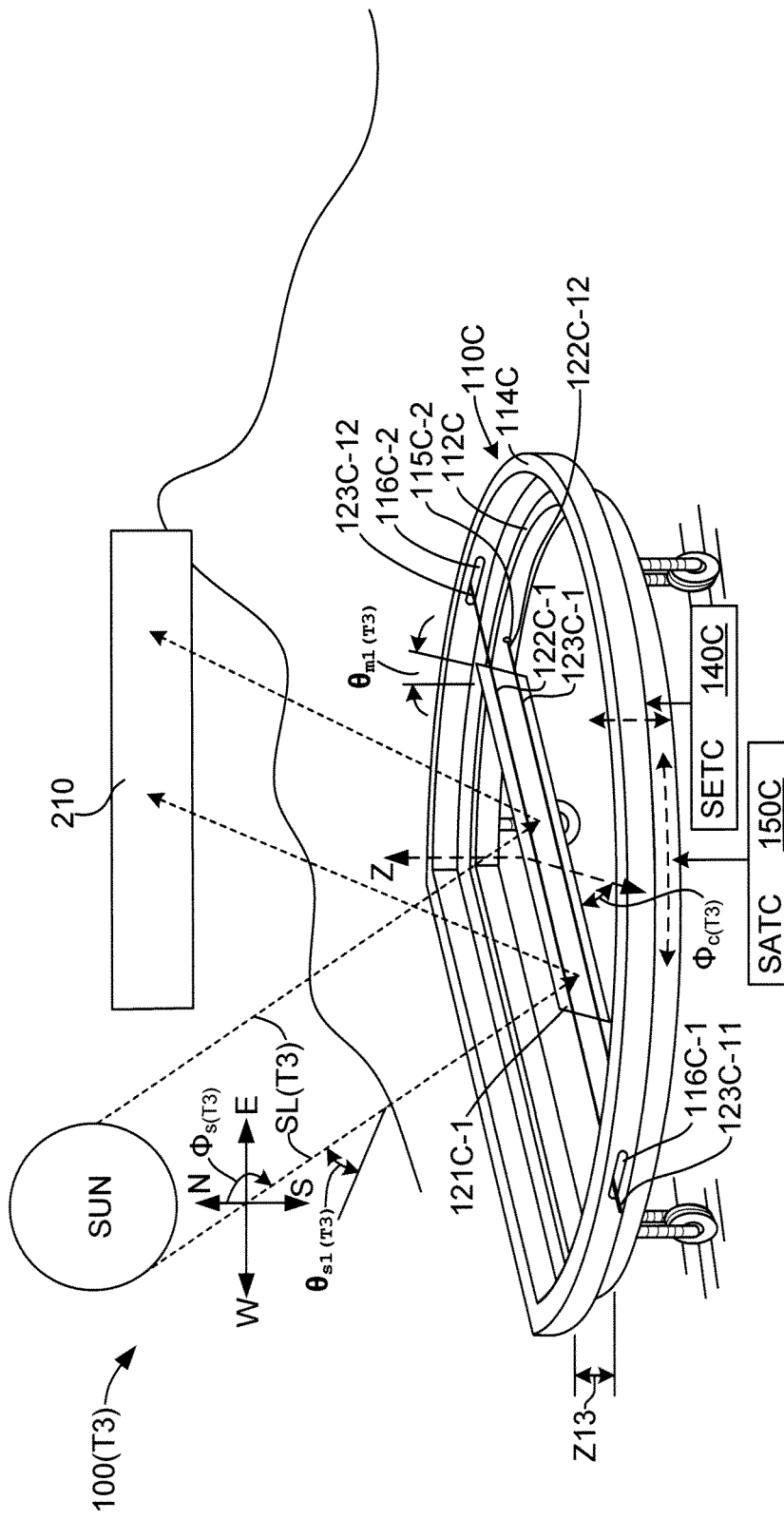

FIGS. 6(A) to 6(C) are top side perspective views showing a simplified heliostat 100C according to another embodiment of the present invention including a carousel 110C in which a mirror 121C-1 is attached to a curved (e.g., ring or cylindrical) peripheral wall 112C and a curved (e.g., ring or cylindrical) tilt-mechanism wall (moveable member) 114C using a concentric ring-type louver arrangement described above with reference to FIG. 2. Tilt-mechanism wall 114C defines slots 116C-1 and 116C-2, and is movably connected to peripheral wall 112C such that tilt-mechanism wall 114C is capable of concentric movement (i.e., vertical movement in the direction of center axis Z while maintaining a parallel orientation) relative to peripheral wall 112C in response to tilt control forces applied under the control of solar elevation tracking controller (SETC) 140C (as indicated by the two-headed dashed-line arrow). Mirror 121C-1 is rotatably connected to peripheral wall 112C by a first rod 122C-1, and is slidably connected to tilt-mechanism wall 114C by a second rod 123C-1. Specifically, opposing ends 122C-11 and 122C-12 of rod 122C-1 are respectively rotatably connected by rotatable bearing structure 115C-1 and 115C-2 to corresponding opposing portions of peripheral wall 112C, and opposing ends 123C-11 and 123C-12 of rod 123C-1 are respectively slidably engaged in slots 116C-1 and 116C-2. This arrangement facilitates louver-type tilt angle control of mirror 121C-1 similar to that described above with reference to FIGS. 2-3(B) by way of vertical (upward/downward) movement of tilt-mechanism wall 114C relative to peripheral wall 112C. Note that only one mirror 121C-1 is shown in FIGS. 6(A) to 6(C) for explanatory purposes—in practical embodiments, multiple mirrors arranged in a mirror array similar to that shown in FIG. 1 would be utilized.

FIGS. 6(A) to 6(C) also illustrate the operation of heliostat 100C during the course of a typical day, and in particular show the rotational and tilt adjustment of mirror 121C-1 in response to the simultaneous operation of both solar azimuth tracking controller (SATC) 150C and SETC 140C to maintain sunlight reflected from mirror 121C-1 on solar receiver 210.

FIG. 6(A) shows heliostat 100C(T1) (i.e., heliostat 100C at dawn) at the beginning of daylight hours when the sun is positioned such that the azimuth angle $\phi_{s(T1)}$ of sunlight rays SL(T1) is directed in a generally northeast-to-southwest direction and the sun's elevation angle $\theta_{S(T1)}$ is relatively shallow due to the sun's low position on the horizon. In accordance with the present embodiment, at time T1, solar azimuth tracking controller 150C positions carousel 110C in a first rotational position $\phi_{c(T1)}$ such that sunlight rays SL(T1) are reflected by mirror 121C-1 at the correct lateral angle onto receiver 210, and solar elevation tracking controller 140C positions tilt-mechanism wall 114C at a first vertical distance Z11 relative to peripheral wall 112C to adjust mirror 121C-1 into a first tilt angle $\theta_{m1(T1)}$ such that sunlight rays SL(T1) are reflected the required elevation angle onto receiver 210.

FIG. 6(B) shows heliostat 100C(T2) (e.g., heliostat 100C at noon) when the sun is positioned such that the azimuth angle $\phi_{s(T2)}$ of sunlight rays SL(T2) is directed in a generally north-to-south direction and the sun's elevation angle $\theta_{s(T2)}$ is at its highest point. In accordance with the present invention, between times T1 and T2, solar azimuth tracking controller 150C causes carousel 110C to gradually or continuously rotate around axis Z such that sunlight rays remain directed by mirror 121C-1 onto receiver 210, whereby at time T2, solar azimuth tracking controller 150C positions base support 130 in at rotational position $\phi_{c(T2)}$. Simultaneously, between times T1 and T2, solar elevation tracking controller 140C causes tilt-mechanism wall 114C to gradually move downward relative to peripheral wall 112C, causing opposing ends 123C-11 and 123C-12 of rod 123C-1 to respectively slide backward along slots 116C-1 and 116C-2, which in turn causes opposing ends 122C-11 and 122C-12 of rod 122C-1 to rotate by way of bearing structure 115C-1 and 115C-2, whereby mirror 121C-1 gradually tilts back such that the sunlight rays remain accurately reflected onto raised solar receiver 210 until, at time T2, solar elevation tracking controller 140C positions tilt-mechanism wall 114C at a second vertical distance Z12 relative to peripheral wall 112C to adjust mirror 121C-1 into a second tilt angle $\theta_{m1(T2)}$ such that sunlight rays SL(T2) are reflected the required elevation angle onto receiver 210.

FIG. 6(C) shows heliostat 100(T3) (e.g., heliostat 100C in the evening) when the sun is positioned such that the azimuth angle $\phi_{s(T3)}$ of sunlight rays SL(T3) is directed in a generally northwest-to-southeast direction and the sun's elevation angle $\theta_{st}$ has again dropped to a lower point. In accordance with the present invention, between times T2 and T3, solar azimuth tracking controller 150C causes carousel 110C to gradually rotate around axis Z such that sunlight rays remain directed by mirror 121C-1 onto receiver 210, whereby at time T3, solar azimuth tracking controller 150C positions base support 130 in at rotational position $\phi_{c(T2)}$. Simultaneously, solar elevation tracking controller 140C causes tilt-mechanism wall 114C to gradually move upward relative to peripheral wall 112C, causing opposing ends 123C-11 and 123C-12 of rod 123C-1 to respectively slide forward along slots 116C-1 and 116C-2, which in turn causes opposing ends 122C-11 and 122C-12 of rod 122C-1 to rotate by way of bearing structure 115C-1 and 115C-2, whereby mirror 121C-1 gradually tilts upward such that the sunlight rays remain accurately reflected onto raised solar receiver 210 until, at time T3, solar elevation tracking controller 140C positions tilt-mechanism wall 114C at a third vertical distance Z13 relative to peripheral wall 112C to adjust mirror 121C-1 into a third tilt angle $\theta_{m1(T3)}$ such that sunlight rays SL(T3) are reflected the required elevation angle onto receiver 210.

As set forth in the description above, by forming curved peripheral wall 112C and curved tilt-mechanism wall 114C with concentric "D" shapes, the resulting substantially round shape of carousel 110C allows arranging multiple heliostats 100C in a closely spaced relationship, thereby facilitating a much higher ground coverage ratio than that achievable using conventional upright-mirror heliostats. Moreover, the D-shape of peripheral wall 112C and tilt-mechanism wall 114C facilitates operating both structures from a single location because the curved wall portions remain a substantially fixed distance from mirror positioning system 130C for substantially all rotational positions $\phi_c$ of the carousel 110C. Further, by combining this concentric arrangement with louver-type tilt mechanism, carousel 110C facilitates simultaneous tilting of multiple elongated mirrors with one actuation (e.g., as described below with reference to FIGS. 7(A)-8(C)).

Figure 7A:
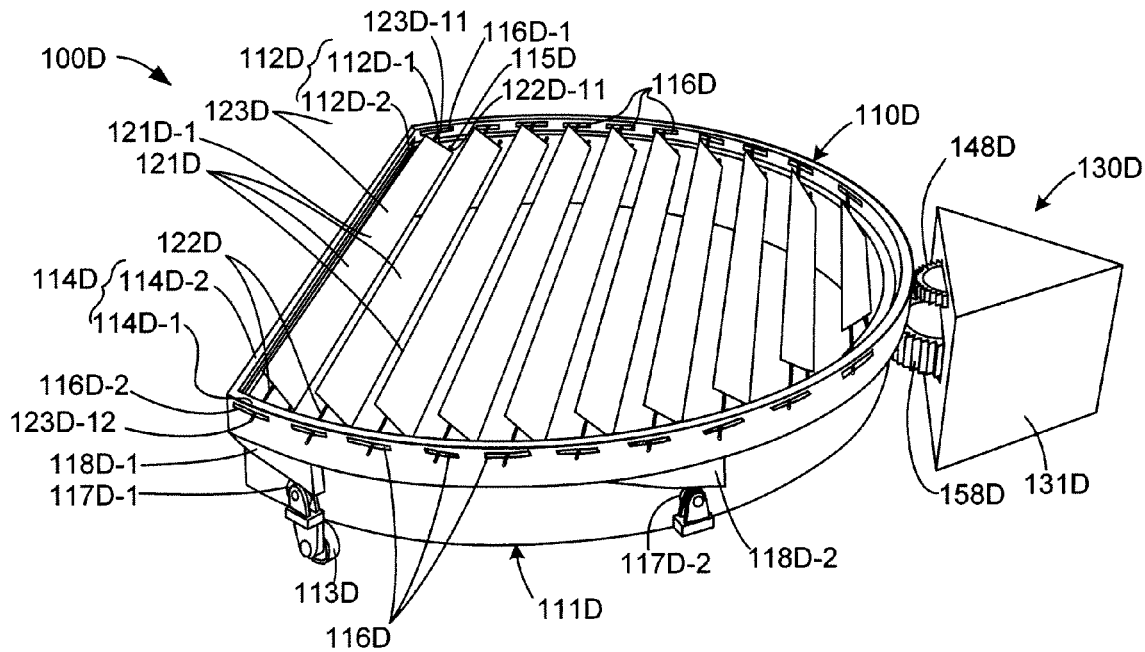
FIGS. 7(A) and 7(B) are simplified top plan views showing a concentric ring-type D-shaped heliostat utilized in accordance with a specific exemplary embodiment of the present invention.
Figure 7B:
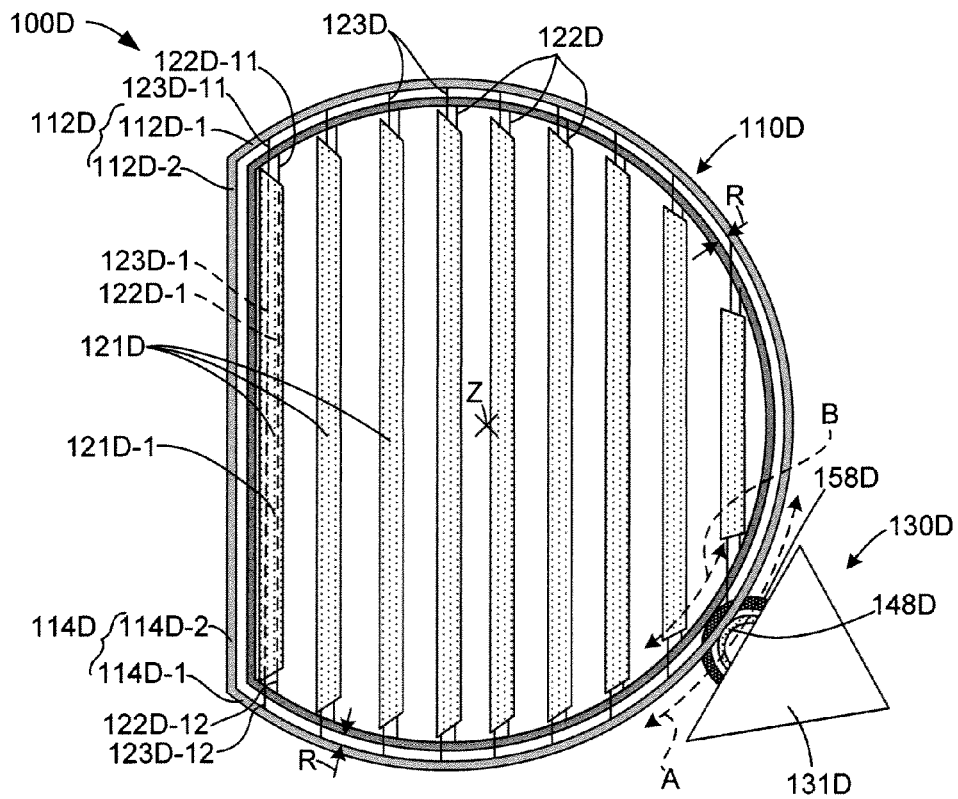

FIGS. 7(A) and 7(B) are top perspective and top plan views, respectively, showing a D-shaped heliostat 100D according to an exemplary specific embodiment of the present invention. Heliostat 100D generally includes a carousel 110D and a mirror positioning system 130D that is fixedly disposed on the ground next to carousel 110D.

Carousel 110D includes base 111D having a cylindrical (curved) peripheral wall 112D that is rotatable around a central axis by way of multiple (e.g., three) wheels 113D, a mirror array 120D disposed inside peripheral wall 112D, and a D-shaped tilt-mechanism wall (moveable member) 114D that is concentrically disposed and movably connected to an upper edge of peripheral wall 112D.

Peripheral wall 112D and tilt-mechanism wall 114D are concentric D-shaped structures that independently rotate around central axis Z. Peripheral wall 112D includes a (first) continuously curved (e.g., truncated ring or cylinder) wall portion 112D-1 and a (first) straight wall portion 112D-2 that is connected across the edges (ends) of the continuously curved wall portion 112D-1. Tilt-mechanism wall 114D includes a (second) continuously curved wall portion 114D-1 and an optional (second) straight wall portion 114D-2 connected across edges of continuously curved wall portion 114D-1. As indicated in FIG. 7(B), continuously curved wall portion 114D-1 is slightly larger than but otherwise has the same curved shape as that of continuously curved wall portion 112D-1, and is concentrically disposed outside the peripheral edge of continuously curved wall portion 112D-1. That is, continuously curved wall portions 112D-1 and 114D-1 are shaped and sized such that all portions of continuously curved wall portion 114D-1 are disposed at a common radial distance R from corresponding portions of continuously curved wall portion 112D-1, whereby continuously curved wall portion 112D-1 can rotate at least partially around central axis Z without contacting continuously curved wall portion 114D-1. Note that the concentric positions of continuously curved wall portions 112D-1 and 114D-1 may be reversed (i.e., with wall portion 112D-1 outside of wall portion 114D-1).

Mirror array 120D includes multiple elongated flat mirrors 121D that are disposed in a parallel low-profile arrangement similar to that described above. Each mirror 121D (e.g., mirror 121D-1) is attached to peripheral wall 112D and tilt-mechanism wall 114D by way of a louver-type arrangement similar to that described above with reference to FIGS. 6(A) to 6(C). For example, mirror 121D-1 is rotatably connected to peripheral wall 112D by a first rod 122D-1 and slidably connected to tilt-mechanism wall 114D by a second rod 123D-1, where opposing ends 122D-11 and 122D-12 of rod 122D-1 are connected to peripheral wall 112D by rotatable bearing structures 115D, and opposing ends 123D-11 and 123D-12 of rod 123D-1 are respectively slidably engaged in slots 116D-1 and 116D-2. Each of the remaining mirrors 121D are attached in a similar fashion. Similar to the arrangement described above, the louver-type tilt adjustment of mirrors 121D is performed by raising and lowering tilt-mechanism wall 114D relative to peripheral wall 112D.

Figure 8A:
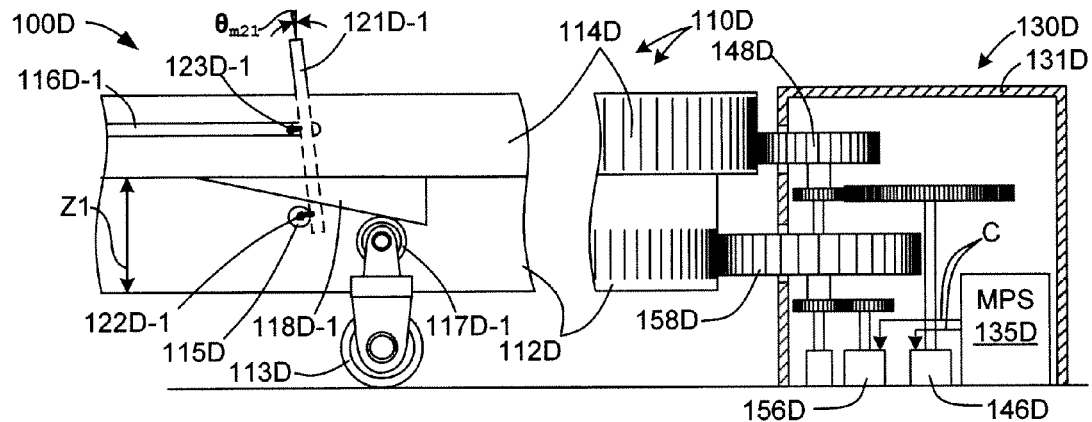
FIGS. 8(A), 8(B) and 8(C) are simplified elevation side views showing the D-shaped heliostat of FIG. 7(A) during an exemplary mirror tilt adjustment operation.
Figure 8B:
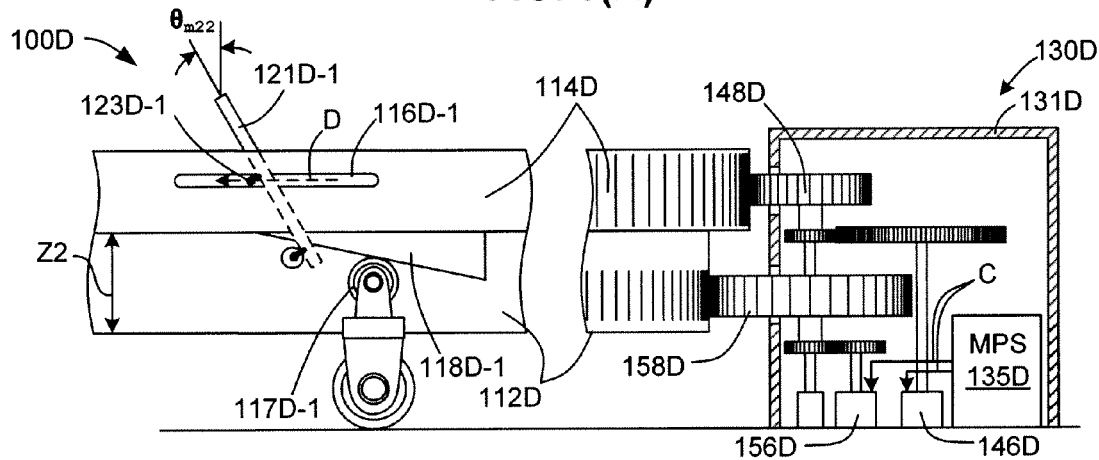
Figure 8C:
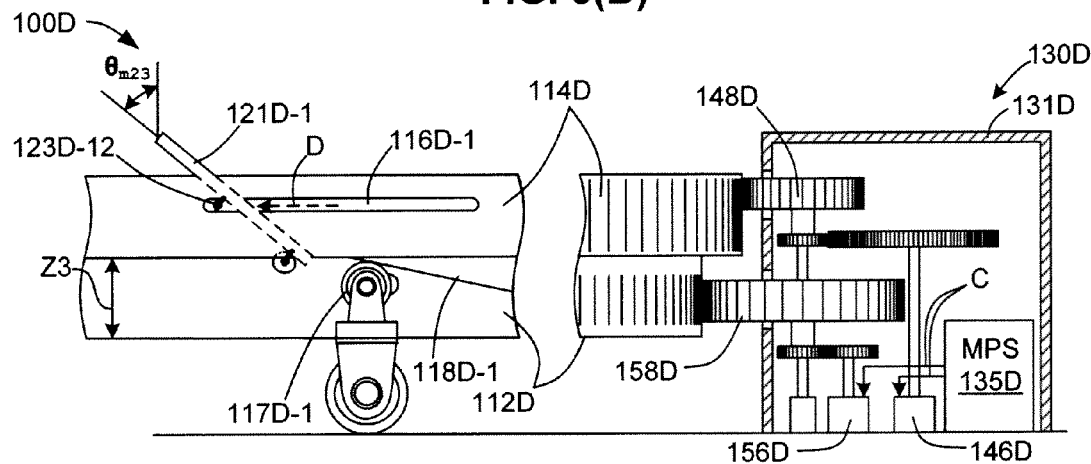

FIGS. 8(A)-8(C) are partial elevation side views showing a portion of heliostat 100D during an exemplary mirror tilt operation. In particular, FIGS. 8(A)-8(C) show a first section of carousel 110D that is contacted by drive wheels/gears 158D and 148D, and a second section of carousel 110D that includes mirror 121D-1, roller 117D-1 and ramp-like wedge structure 118D-1. Mirror positioning system 130D includes a mirror positioning system (MPS) controller 135D disposed inside box 131D along with a (first) rotation control motor 156D and a (second) elevation control motor 146D, which are operably connected to drive wheels/gears 158D and 148D by associated gear trains, respectively. MPS controller 135D generates control signals C consistent with those described above that cause one or both motors 156D and 148D to rotate drive wheels/gears 158D and/or 148D, whereby peripheral wall 112D and tilt-mechanism wall 114D are concentrically rotated in a manner similar to that described above.

FIG. 8(A) shows heliostat 100D in a first position (e.g., when the sun's elevation angle is relatively shallow) in which the relative rotational positions of tilt-mechanism wall 114D and peripheral wall 112D are set by drive wheels/gears 158D and 148D such that mirror 121D-1 is in a substantially upright tilt angle $\theta_{m21}$. In particular, tilt-mechanism wall 114D is rotated relative to peripheral wall 112D such that roller 117D-1 is located at a lower end of ramp-like wedge structure 118D-1, which causes tilt-mechanism wall 114D to have a height Z1 relative to peripheral wall 112D, which in turn causes rod 123D-1 to slide along slot 116D-1 such that mirror 121D-1 pivots around bearing 115D/rod 121D-1 into tilt angle $\theta_{m21}$.

FIG. 8(B) shows heliostat 100D in a second position (e.g., at midmorning when the sun's elevation angle is between sunrise and its zenith) in which the relative rotational positions of tilt-mechanism wall 114D and peripheral wall 112D are set such that mirror 121D-1 is in a partially inclined tilt angle $\theta_{m22}$. To adjust mirror 121D-1 from upright tilt angle $\theta_{m21}$ to partially inclined tilt angle $\theta_{m22}$, drive wheels/gears 158D and 148D are respectively driven by motors 156D and 146D in accordance with control signals C such that tilt-mechanism wall 114D rotates a predetermined angular distance (e.g., as indicated by the arrow D) relative to peripheral wall 112D. This relative rotation causes roller 117D-1 to roll to a central point along ramp-like wedge structure 118D-1, which causes tilt-mechanism wall 114D to move concentrically downward relative to peripheral wall 112D to height Z2, which in turn causes rod 123D-1 to slide along slot 116D-1 such that mirror 121D-1 pivots downward into tilt angle $\theta_{m22}$.

FIG. 8(C) shows heliostat 100D in a third position (e.g., at noon when the sun's elevation angle is at its zenith) in which the relative rotational positions of tilt-mechanism wall 114D and peripheral wall 112D are set such that mirror 121D-1 is in a fully inclined tilt angle $\theta_{m23}$. To adjust mirror 121D-1 from partially inclined tilt angle $\theta_{m22}$ to fully inclined tilt angle $\theta_{m23}$, drive wheels/gears 158D and 148D are respectively driven such that tilt-mechanism wall 114D rotates a further predetermined angular distance relative to peripheral wall 112D, whereby roller 117D-1 rolls further along ramp-like wedge structure 118D-1 to its uppermost end, which causes tilt-mechanism wall 114D to move further concentrically downward relative to peripheral wall 112D to height Z3, which in turn causes rod 123D-1 to slide along slot 116D-1 such that mirror 121D-1 pivots downward into tilt angle $\theta_{m23}$.

Heliostat 100D facilitates both carousel rotation and mirror tilt-angle control using only two motors (e.g., motors 156D and 146D, see FIG. 8(A)) that respectively engage tilt-mechanism wall 114D and curved wall portion 112D-1 of peripheral wall 112D by way of respective gear trains housed in a single motor box 131D.

According to another aspect of the present invention, the substantially circular carousel rotation pattern and single motor box arrangement of D-shaped heliostats 100D facilitates the arrangement of multiple D-shaped heliostats 100D in a closely-spaced pattern to produce a high ground coverage ratio, while the truncated circular shape of D-shaped heliostats 100D facilitates the formation of service pathways that allow access to any D-shaped heliostats 100D in the closely-spaced pattern.

Figure 9:
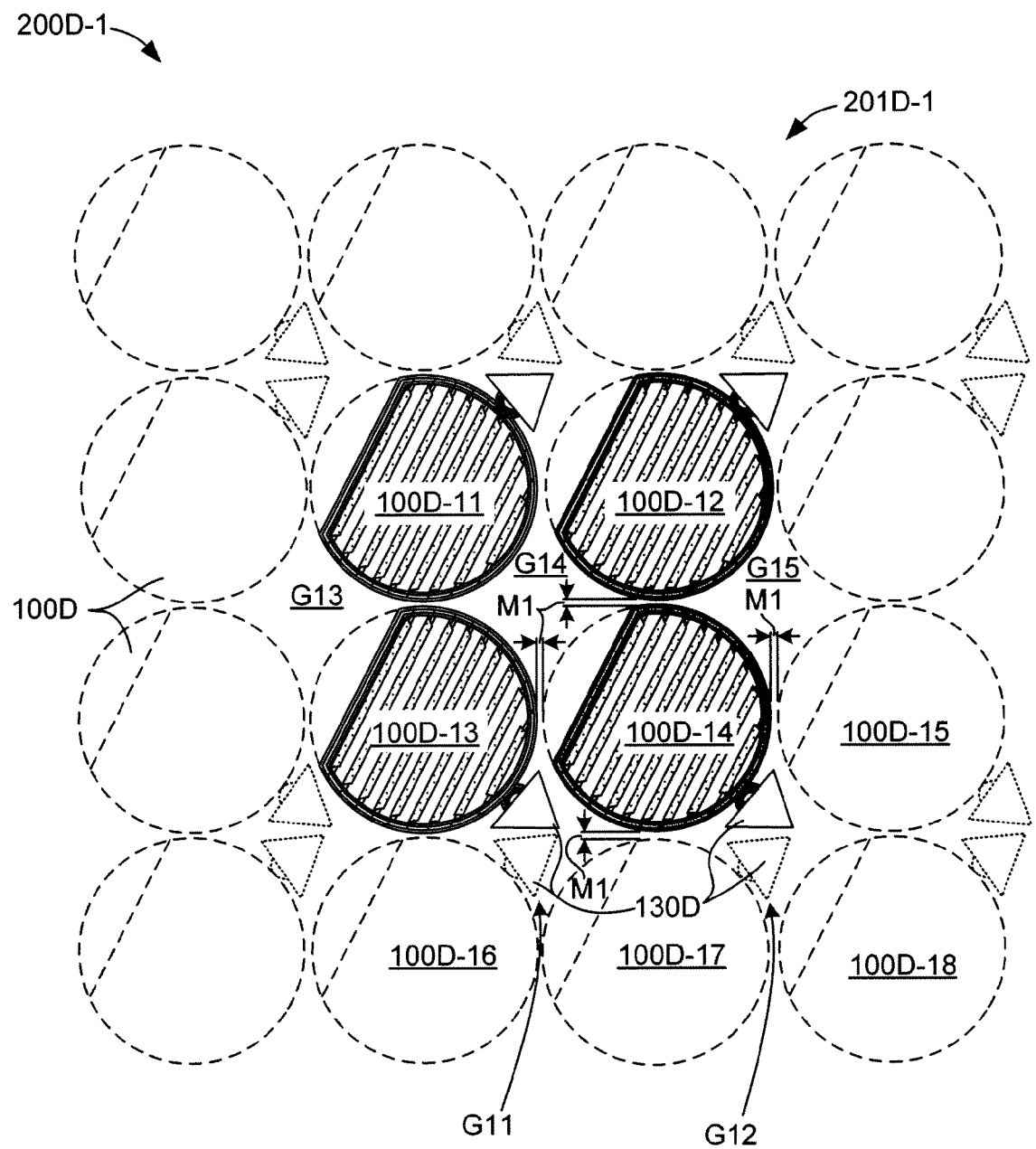
FIG. 9 is a top plan view showing a square-type high fill-factor spacing arrangement including multiple D-shaped heliostats of FIG. 7(A) according to a specific embodiment of the present invention.
Figure 11:
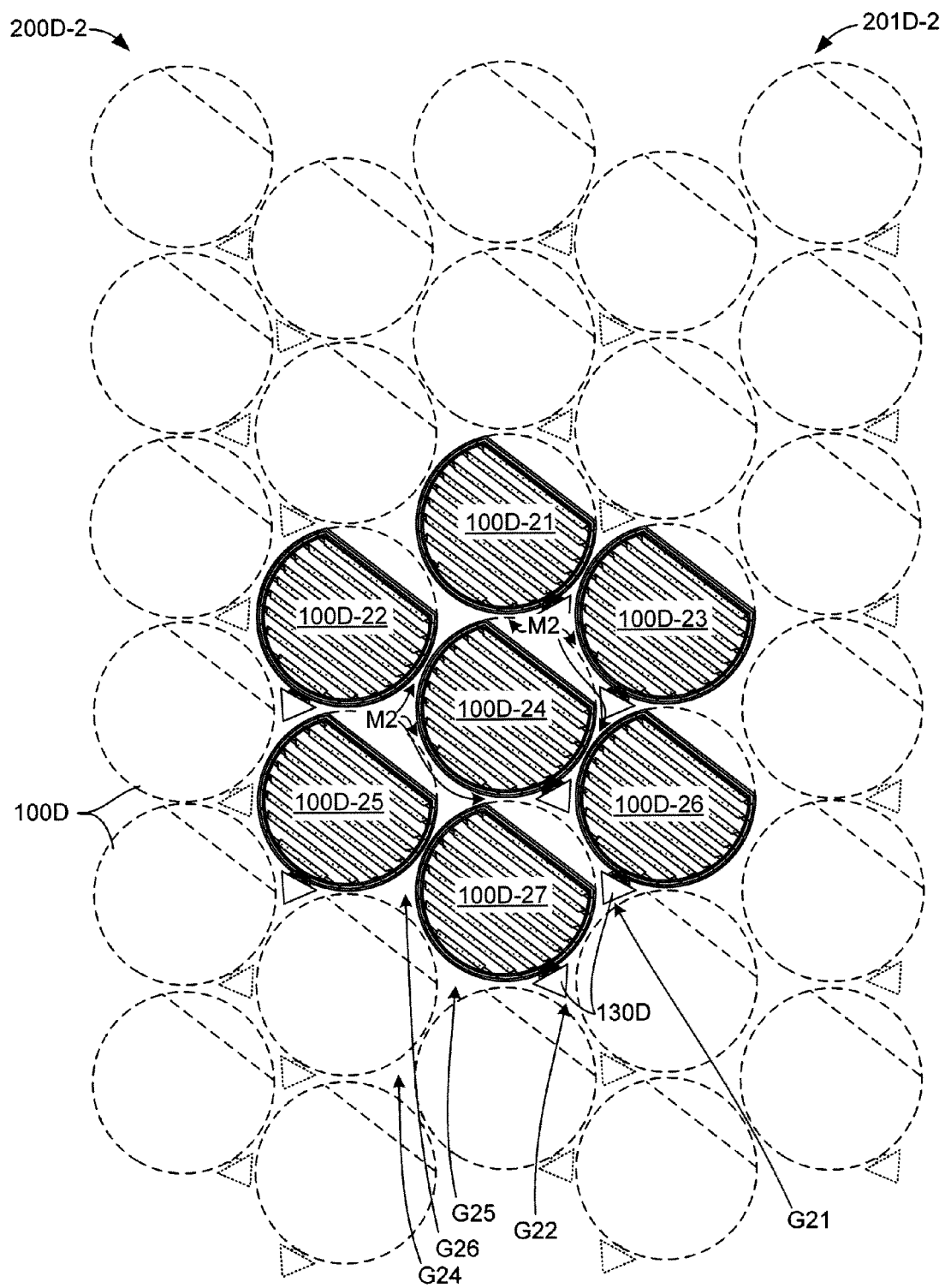
FIG. 11 is a top plan view showing a heliostat array including multiple D-shaped heliostats of FIG. 7(A) in a hexagon-type high fill-factor spacing arrangement according to a specific embodiment of the present invention.

As used herein, the term "closely spaced pattern" is intended to mean a heliostat spacing arrangement in which the amount of exposed underlying support surface (i.e., the amount of ground not covered by carousels 110D and motor boxes 131D) is minimized while providing sufficient room for rotation of each carousel 110D. For example, FIG. 9 shows a portion of an exemplary array 201D-1 of a solar tower system 200D-1 in which heliostats 100D are arranged in a closely-spaced square pattern, with an exemplary "square" being indicated by heliostats 100D-11 to 100D-14. FIG. 11 shows a portion of a second exemplary array 201D-2 of a solar tower system 200D-2 in which heliostats 100D are arranged in a closely-spaced hexagonal pattern, with an exemplary "hexagon" being indicated by heliostats 100D-21 to 100D-27. The disclosed square and hexagonal patterns of FIGS. 9 and 11 are intended to be exemplary and not limiting to an appended claim unless specifically recited in that claim.

In accordance with an embodiment of the present invention, each "closely spaced pattern" (heliostat spacing arrangement) includes disposing heliostats 100D at regular intervals such that each heliostat 100D is disposed at a predetermined minimum distance from at least two adjacent heliostats 100D. In particular, heliostats 100D are preferably disposed in a repeated pattern such that the substantially circular carousel rotation pattern of each heliostat 100D is spaced from two or more adjacent heliostats 100D by the same predetermined minimum distance. For example, in the closely-spaced square pattern shown in FIG. 9, each heliostat 100D is disposed at a minimum practical distance M1 from four adjacent heliostats 100D (e.g., heliostat 100D-14 is spaced distance M1 from heliostats 100D-12, 100D-13, 100D-15 and 100D-17). Similarly, in the closely-spaced hexagonal pattern shown in FIG. 11, each heliostat 100D is disposed at a minimum practical distance M2 from six adjacent heliostats 100D (e.g., heliostat 100D-24 is spaced distance M2 from heliostats 100D-21, 100D-22, 100D-23, 100D-25, 100D-26 and 100D-27). The benefit of positioning heliostats 100D at regular intervals is that this arrangement facilitates reliable formation of service pathways, as set forth below. Distances M1 and M2 are determined by practical considerations, but are preferably minimized to maximize the ground coverage ratio of arrays 201D-1 and 201D-2. Note that the dashed-line circles around the perimeter of each heliostat 100D indicate the substantially circular carousel rotation pattern of that heliostat in both FIGS. 9 and 11.

In accordance with yet an embodiment of the present invention, each "closely spaced pattern" (heliostat spacing arrangement) includes disposing heliostats 100D in at least one of parallel row and parallel columns, and disposing the mirror positioning system (motor box) of heliostats 100D in adjacent pairs of rows/columns in areas of said support surface located between said plurality of heliostats 100D of the adjacent pairs of rows/columns. For example, in the closely-spaced square pattern shown in FIG. 9, heliostats 100D-13, 100D-14 and 100D-15 are part of a first row, and heliostats 100D-16, 100D-17 and 100D-18 are part of a second row that is disposed adjacent to (i.e., immediately below) the first row. Each mirror positioning system 130D associated with these two adjacent rows is disposed in the substantially diamond-shaped "unused" areas between the two adjacent rows. For example, the mirror positioning systems 130D of heliostats 100D-13 and 100D-16 are disposed in area G11, and the mirror positioning systems 130D of heliostats 100D-14 and 100D-17 are disposed in area G12. Note that horizontally aligned "unused" areas, such as areas G13, G14 and G15, that are disposed above and below the adjacent row pair, are intentionally unused (i.e., free of equipment) for purposes described below. Referring to the closely-spaced hexagonal pattern shown in FIG. 11, heliostats 100D-22 and 100D-25 are part of a first column, heliostats 100D-21, 100D-24 and 100D-27 are part of a second column that is disposed adjacent to and offset from the first column, and heliostats 100D-23 and 100D-26 are part of a third column that is disposed adjacent to and offset from the second column. In this example the second and third adjacent offset columns form a column "pair", with the mirror positioning system 130D of each heliostat in the two columns (e.g., the mirror positioning system 130D of heliostats 100D-26 and 100D-27) disposed in the substantially triangle-shaped "unused" areas between the two adjacent rows (i.e., in areas G21 and G22, respectively), and vertically aligned "unused" areas (e.g., areas G23, G24 and G25) that are disposed to the left and right of the adjacent column pair, are intentionally unused for purposes described below.

Figure 10:
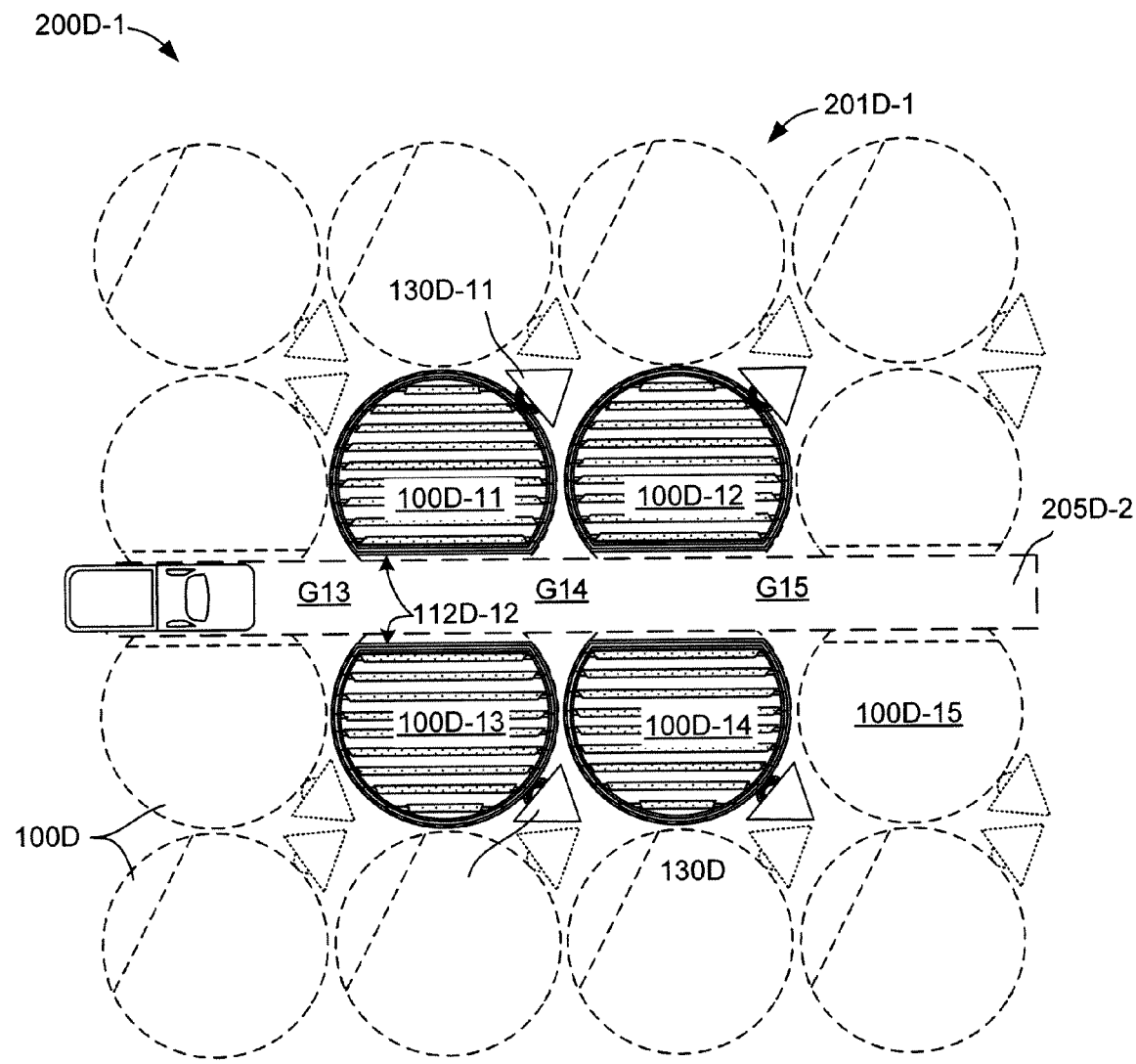
FIG. 10 is a top plan view showing the heliostat array of FIG. 9 with the flat wall portions turned to form a service pathway between the D-shaped heliostats according to an aspect of the present invention.

According to another aspect of the present invention, by arranging heliostats 100D in closely-spaced patterns such as those described above, service pathways are selectively formed between adjacent heliostats 100D when the carousels of at least some of the heliostats 100D are rotated such that the straight wall portions of the carousels are parallel, thereby allowing access to any heliostat 100D for purposes of maintenance. For example, FIG. 10 shows the array 201D-1 with all heliostats 100D configured such that the straight wall portion of each heliostat 100D is horizontal (i.e. parallel to the rows) and faces away from the heliostat's mirror positioning system. That is, straight wall portion 112D-12 of heliostat 100D-11 is aligned horizontally and faces away from mirror positioning system 130D-11, and straight wall portion 112D-

Figure 12A:
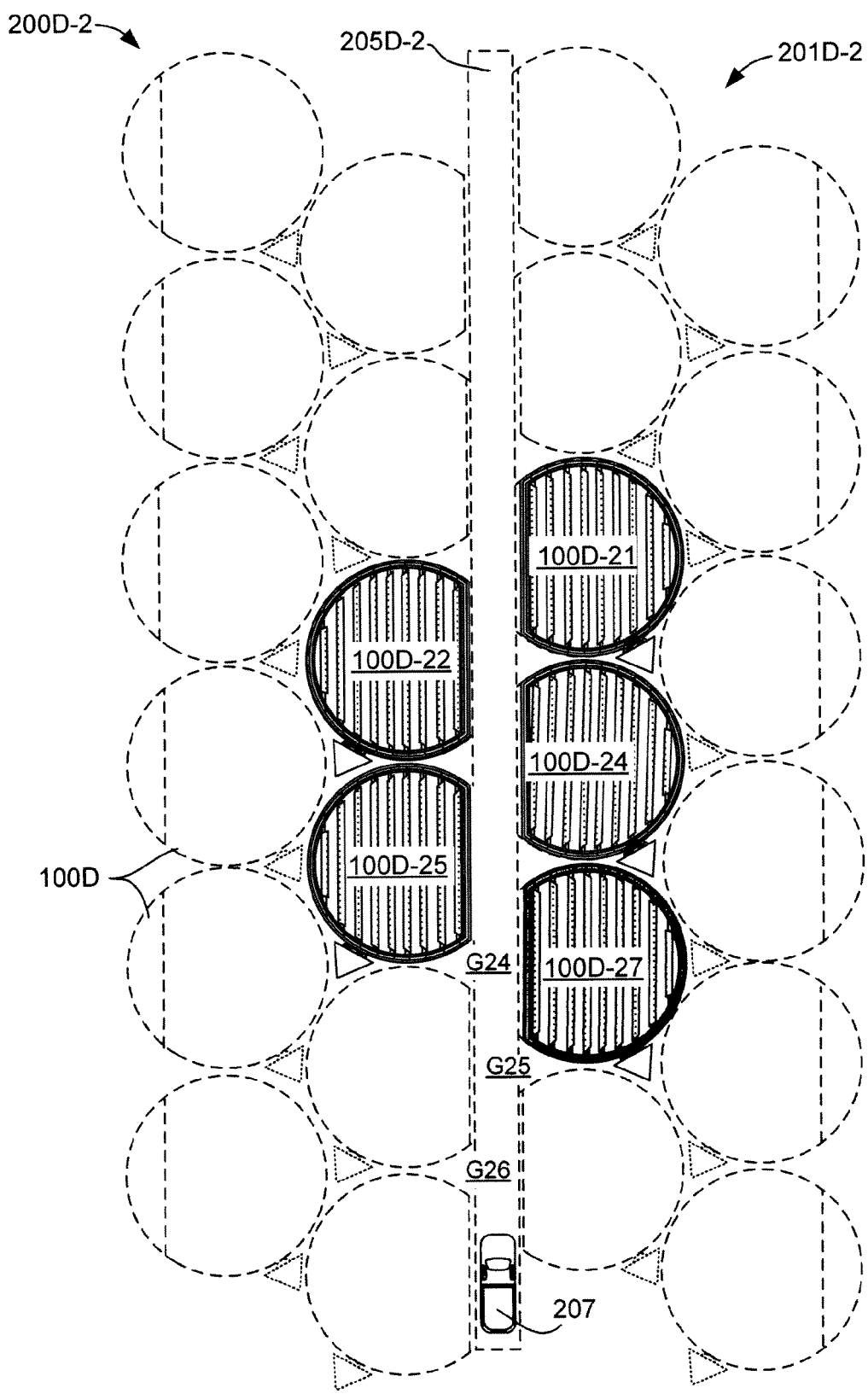
FIGS. 12(A) and 12(B) are a top plan views showing the heliostat array of FIG. 10 with the flat wall portions turned to form a service pathway between the D-shaped heliostats according to an aspect of the present invention.
Figure 12B:
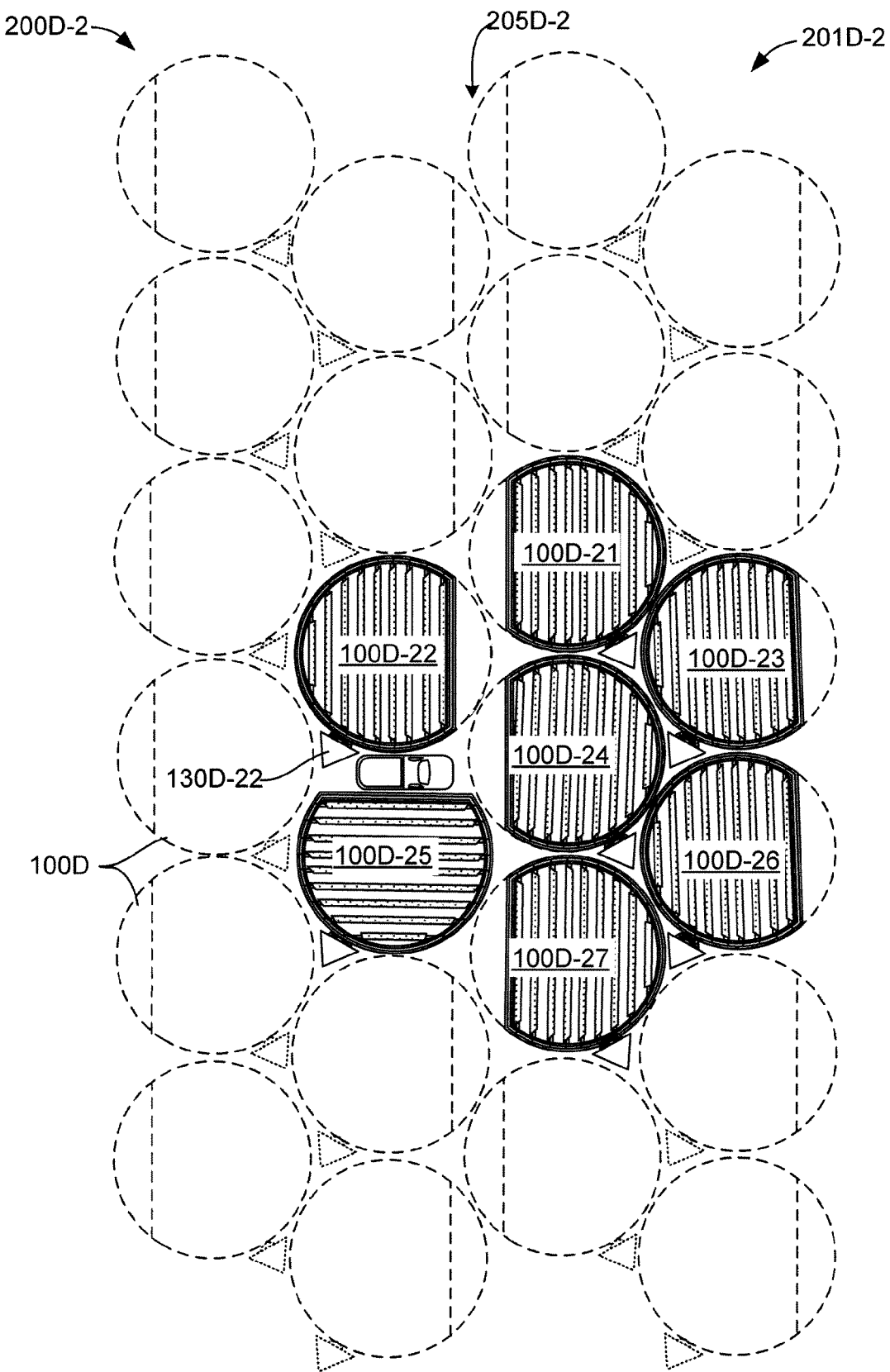
Figure 13A:
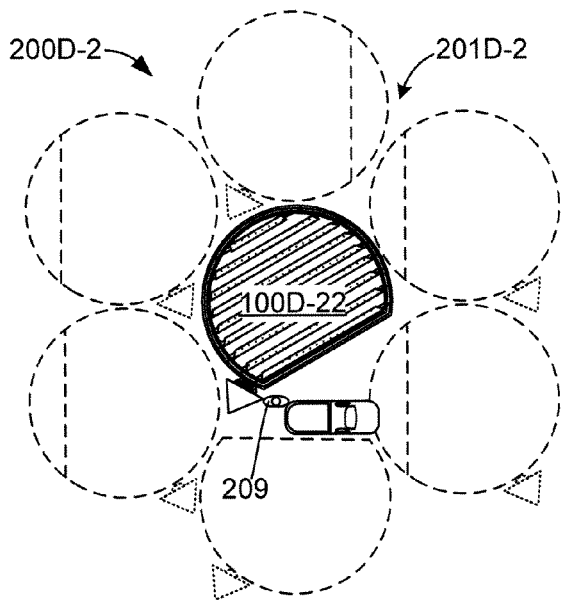
FIGS. 13(A), 13(B), 13(C) and 13(D) are top plan view showing a portion of the heliostat array of FIG. 10 during maintenance of a selected heliostat according to another aspect of the present invention.
Figure 13B:
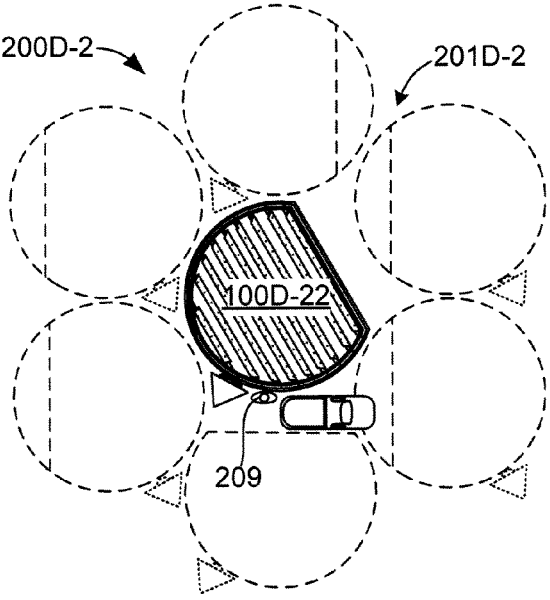
Figure 13C:
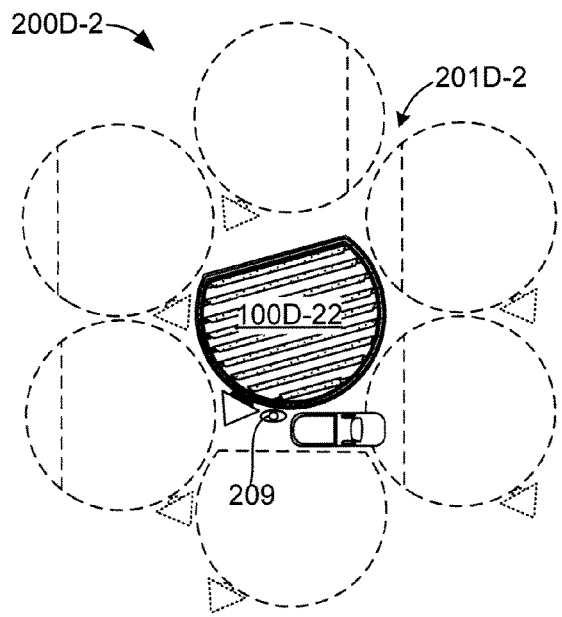
Figure 13D:
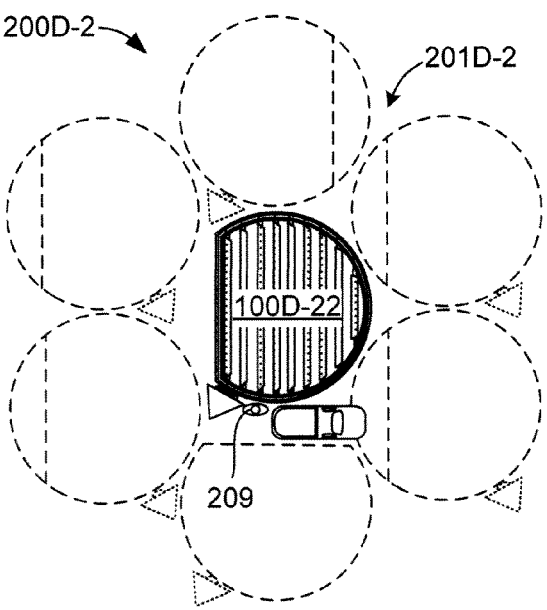

12 of heliostat 100D-13 is aligned horizontally and faces away from mirror positioning system 130D-13. This configuration, which can be implemented, for example, by time-activated or remote-activated settings stored by each mirror positioning system 130D, produces a horizontally aligned service pathway 205D-1 between the adjacent row pairs of heliostats 100D (i.e., across "unused" areas G13, G14 and G15) along which a service vehicle 207 may be driven to perform maintenance on any heliostat 100D of array 201D-1. Similarly, FIG. 12(A) shows the array 201D-2 with all heliostats 100D configured such that the straight wall portion of each heliostat 100D is aligned vertically (i.e. parallel to the offset column) and faces away from the heliostat's mirror positioning system, producing a vertically aligned service pathway 205D-2 between the adjacent offset column pairs of heliostats 100D (i.e., across "unused" areas G23, G24 and G25) along which service vehicle 207 may be driven to perform maintenance on any heliostat 100D of array 201D-2. Further, as illustrated in FIG. 12(B), once vehicle 207 has driven along service pathway 205D-2 to a selected heliostat (e.g., heliostat 100D-22), an adjacent heliostat (e.g., heliostat 100D-25) may be turned to provide access to the mirror positioning system (e.g., system 130D-22) of the selected heliostat.

FIGS. 13(A)-13(D) are top plan view showing a portion of array 201D-2 during maintenance of selected heliostat 100D-22 according to another aspect of the present invention. As mentioned above, mounting each mirror array such that all mirror support connections are located adjacent to the peripheral wall simplifies maintenance of heliostats 100D by allowing a maintenance person to service all of the mirror connections while standing in a single location. That is, as depicted in FIGS. 13(A) to 13(D), a maintenance person 209 can access any mirror support connection needing service simply by rotating the carousel of selected heliostat 100D-22 around its central axis until the mirror support connection is at his/her location).

Those skilled in the art will recognize that the closely-spaced pattern and the size/shape of the D-shaped heliostats utilized in a solar power harvesting system produced in accordance with the present invention are determined by various practical considerations, and therefore are not limited to those described herein. For example, while the closely-spaced hexagonal heliostat configuration provides a higher ground coverage ratio than the closely-spaces square pattern, the space between adjacent heliostats in the closely-spaced hexagonal heliostat configuration may be insufficient for a required mirror positioning system motor box. Similarly, although a circular carousel would provide the largest ground coverage ratio, the D-shaped carousel described herein allows for service pathways as described above, and the size of the straight peripheral wall portion (i.e., the amount of a substantially round carousel that is truncated to provide the required "D" shape) is determined at least in part by the size of the required service path (e.g., the width of the maintenance vehicle). By selecting a closely-spaced heliostat pattern that both provides a maximum ground coverage ratio and accommodates the required mirror positioning system motor box, and by tailoring the D-shaped carousel to minimize excess service pathway clearance, an optimal solar power harvesting system is produced in accordance with the present invention.

Figure 14A:
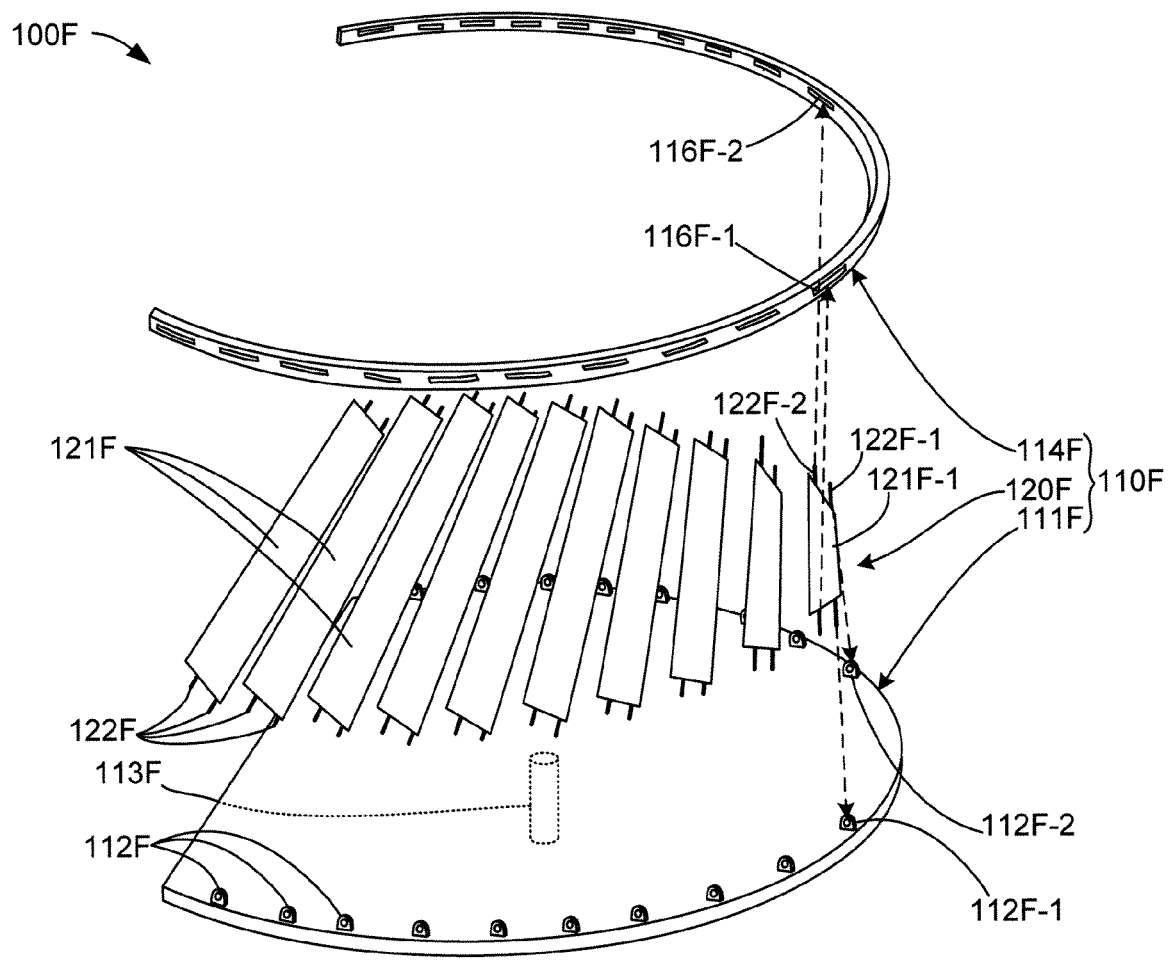
FIGS. 14(A) and 14(B) are a exploded top plan and assembled top plan views, respectively, showing a D-shaped carousel of a heliostat according to an aspect of the present invention.
Figure 14B:
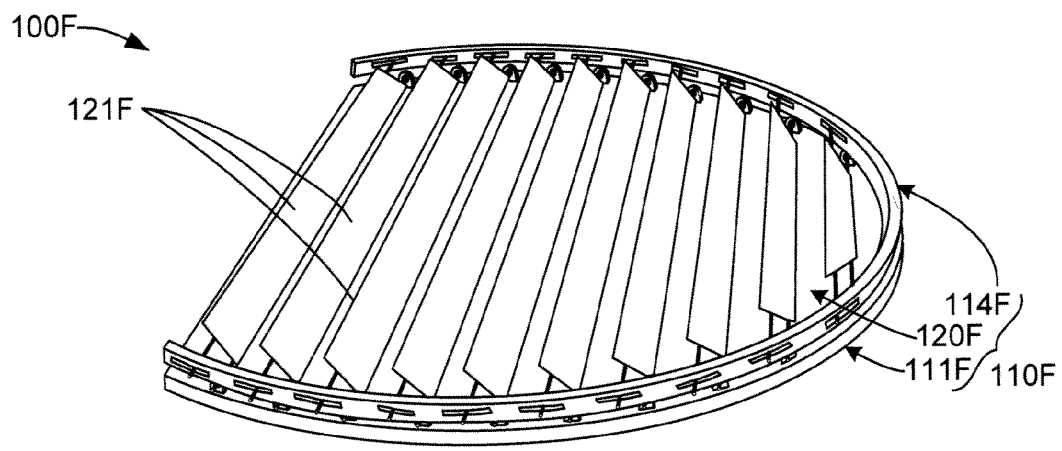

FIGS. 14(A) and 14(B) show a carousel 110F of a D-shaped heliostat 100F according to another embodiment of the present invention. As mentioned above, benefits of the present invention may be achieved using a carousel that omits a peripheral wall, although this would reduce the potential windload preventing benefits that are mentioned above. Carousel 110F generally includes a D-shaped base 111F, a C-shaped tilt-angle control mechanism 114F, and a mirror array 120F. D-shaped base 111F is a substantially flat plate-like structure that includes multiple mounts (peripheral edge structures) 112F disposed along a peripheral edge thereof. D-shaped base 111F is rotatably (movably) disposed on a support surface by way of a central post 113F and associated roller bearings such that rotation of base 111F around a central axis defined by post 113F causes peripheral edge structures 112F to rotate as a unit around the central axis. C-shaped tilt-angle control mechanism 114F defines multiple slots 116F similar to those described above, and is positioned over the curved peripheral portion of D-shaped base 111F. Mirror array 120F includes multiple elongated flat mirrors 121F that are mounted on parallel rods 122F. As indicated in FIG. 14(A), each mirror 121F is attached by way of one rod 121F to corresponding peripheral edge structures 112F and by the other rod 121F to corresponding slots 116F of tilt-angle control mechanism 114F. For example, as indicated by the dashed line arrows at on the right side of FIG. 14(A), mirror 121F-1 is connected by way of rod 121F-1 to peripheral edge structures 112F-1 and 112F-2, and by way of rod 121F-2 to slots 116F-1 and 116F-2. As indicated in FIG. 14(B), when operably assembled, mirror array 120F is maintained in a low-profile, substantially horizontal plane. Base 111F and mirrors 121F are rotated/tilted in accordance with a given sun position by way of a mirror positioning system (not shown) in a manner similar to that described above.

Figure 15:
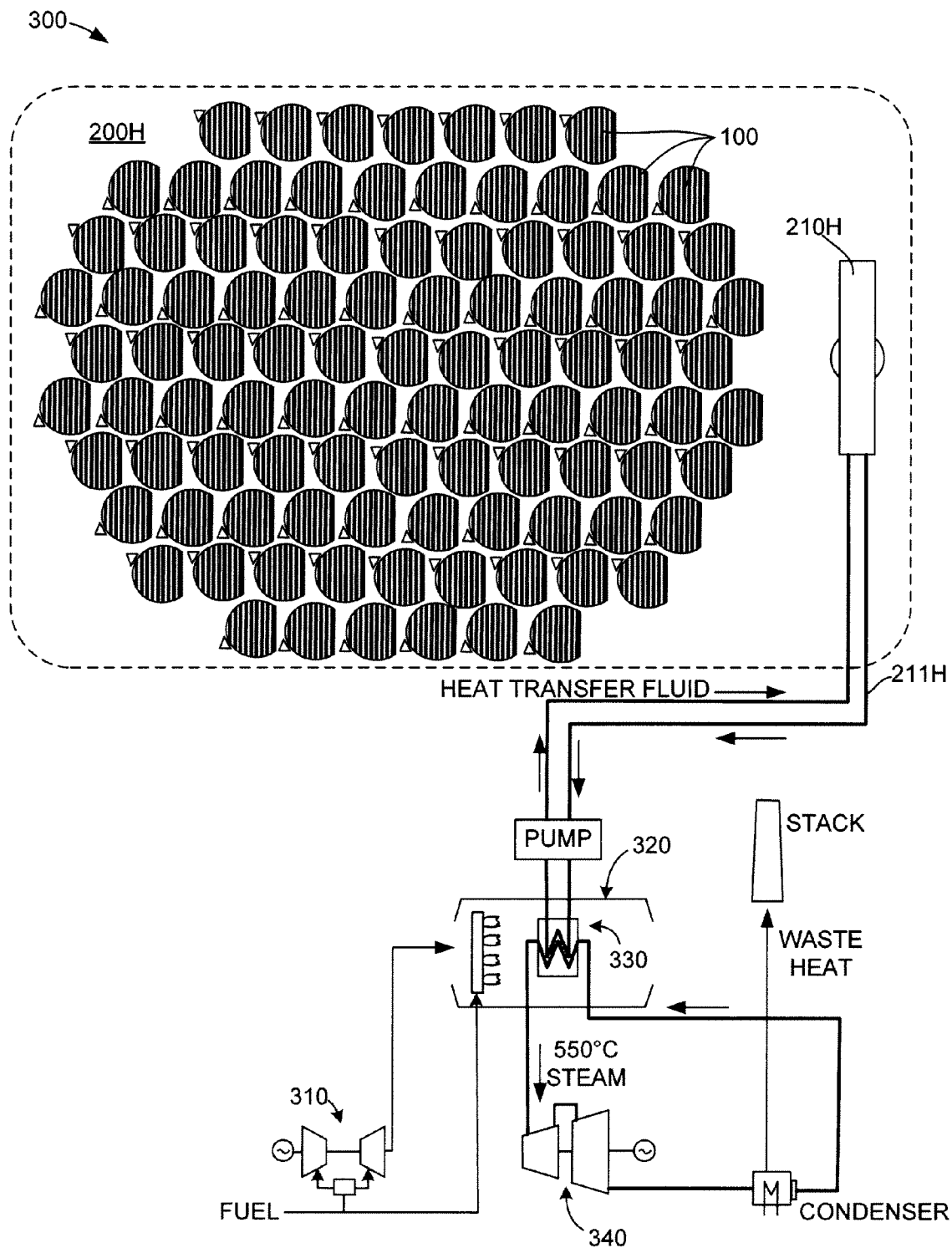
FIG. 15 is a simplified diagram showing a cogeneration power system including a solar tower system of the present invention according to another alternative specific embodiment.

FIG. 15 is a simplified diagram showing a co-generation power plant 300 utilizing both a solar tower system 200H produced according to any of the embodiments described above, and a conventional natural gas heat generator 310 to generate steam in a conventional steam production facility 320 for driving a steam turbine 340. In accordance with this embodiment of the present invention, solar tower system 200H includes an array of heliostats 100 disposed in an area next to steam production facility 320, and a heat-exchange-type solar receiver 210H having a conduit 211H containing a heat transfer fluid that is heated by the sunlight concentrated by heliostats 100 (i.e., any of the specific heliostat embodiments described herein) in the manner described above. The heated transfer fluid is then transferred by conduit 211H to a heat exchanger 330 disposed inside steam production facility 320. Steam production facility 320 is configured to utilize both solar tower system 200F and natural gas heat generator 310 to generate super-heated steam at 550° C. that drives steam turbine 340, thus generating electricity. During bright sunny days, sufficient heat is generated by solar tower system 200H such that 550° C. steam is generated is generated by steam generator 320 without assistance from natural gas heat generator 310. At night (or on cloudy days when solar energy is insufficient to achieve steam at 550° C.), natural gas heat generator 310 is implemented to generate the desired steam temperature, possibly in conjunction with or replaced by a heat storage facility. The solar tower systems of the present invention are ideally suited for use in such co-generation power plant arrangements because they combine a clear set of upfront costs, low land use, low maintenance costs, and highly reliable performance expectations.

Although the present invention has been described with respect to certain specific embodiments, it will be clear to those skilled in the art that the inventive features of the present invention may be implemented using analogous but mechanically different embodiments, all of which are intended to fall within the scope of the present invention. In addition, the description of the present invention has been simplified to highlight relevant novel features, with related structural features (e.g., stiffening braces inside the peripheral wall to reduce material thickness requirements) omitted for brevity. It is further noted that the heliostat arrangement may be modified, for example, such that a single motor box is used to drive three neighboring carousels. In this case, a single gear/wheel may be used to drive all three neighboring carousels, but a currently preferred arrangement would use a driven gear/wheel to drive one carousel, and undriven rollers to drive the other two carousels.

It should also be noted that the provided heliostats are given without a limiting reference to a specific size scale. The benefits of what is taught here may apply to devices ranging throughout a wide range of sizes (diameters), as will be appreciated by those skilled in the art. Progressing to smaller sized heliostats, the structural efforts (mechanical loads, costs) will typically decrease, while at the same time the cost for assembly, electronics modules, actuators, etc., will increase due to the higher part count. However, the higher number of smaller sized heliostats has the potential to harness improved economies of scale in production. Those skilled in the art will appreciate, that based on those and similar arguments, an optimum size scale will be found, depending on the circumstances, geography and year of construction.

The invention claimed is:

1. A solar tower system comprising:
   a solar receiver fixedly disposed over a support surface;
   an array including a plurality of heliostats disposed on the support surface adjacent to the solar receiver, each heliostat including:
      a rotatable carousel having a substantially D-shaped base including a peripheral edge structure surrounding a central region, the base being disposed on the support surface such that the peripheral edge structure is rotatatable around a central axis located in the central region,
      a mirror array including a plurality of elongated flat mirrors arranged in a low-profile, substantially horizontal plane and disposed in the central region, each elongated flat mirror being movably connected to and simply supported between corresponding portions of the peripheral edge structure such that said each elongated flat mirror is maintained in a corresponding tilt angle; and
      a mirror positioning system fixedly disposed on the support surface adjacent to the carousel, the mirror positioning system including:
         a solar elevation tracking controller including means for adjusting the tilt angle of each of the plurality of elongated flat mirrors in accordance with a determined sun elevation angle such that sunlight directed onto the mirror array from said determined sun elevation angle is reflected by all of the plurality of elongated flat mirrors onto the solar receiver, and
         a solar azimuth tracking controller including means operably connected to the peripheral wall for adjusting the rotational position of the carousel around the central axis in accordance with a determined sun azimuth angle such that sunlight directed onto the mirror array from said determined sun azimuth angle is reflected by all of the plurality of elongated flat mirrors onto the solar receiver.

2. A solar tower system of claim 1,
   wherein the substantially D-shaped peripheral edge structure of each said heliostat comprises a curved wall portion and a straight wall portion connected across edges of the curved wall portion, and
   wherein the solar azimuth tracking controller of each said heliostat includes a drive mechanism operably coupled to said curved wall portion.

3. A solar tower system of claim 2,
   wherein each said heliostat further comprises one or more tilt-angle control mechanisms disposed on the peripheral edge structure and connected to said mirror array such that each elongated flat mirror is connected to the tilt-angle control mechanism, and
   wherein the solar elevation tracking controller of said each heliostat further includes means for manipulating the tilt-angle control mechanism such that the tilt angle of each of the plurality of elongated flat mirrors is adjusted by the tilt-angle control mechanism.

4. A solar tower system of claim 3,
   wherein the tilt-mechanism of said each heliostat comprises a moveable member that is moveably connected to the peripheral edge structure and defines a plurality of slots, and
   wherein each elongated flat mirror of each mirror array includes a first rod that is rotatably connected to the peripheral edge structure of said each heliostat, and a second rod that is slidably engaged in a corresponding slot of said plurality of slots such that movement of the movable member in a first direction relative to the peripheral edge structure causes the corresponding tilt angle of said each elongated flat mirror to decrease, and such that movement of the movable member in a second direction relative to the peripheral edge structure causes the corresponding tilt angle of said each elongated flat mirror to increase.

5. A solar tower system of claim 4, wherein the the solar elevation tracking controller of each said heliostat includes a first motor and associated linkage mechanism for causing said movable member to move away from the peripheral edge structure in order to decrease the corresponding tilt angle of said each elongated flat mirror, and for causing said movable member to move toward the peripheral edge structure in order to increase the corresponding tilt angle of said each elongated flat mirror.

6. A solar tower system of claim 4, wherein the solar elevation tracking controller of each said heliostat comprises:
   a device for determining a sun elevation angle,
   a processor for generating control signals in response to the determined sun elevation angle, and
   a motor for supplying a positioning force to said movable member until the corresponding tilt angle of said each elongated flat mirror causes said each elongated flat mirror to reflect sunlight onto said solar receiver of a solar power harvesting system.

7. A solar tower system claim 1, wherein said carousel of each said heliostat further comprises a passive movable support mechanism disposed between the base and the support surface.

8. A solar tower system claim 7, wherein each said heliostat further comprises a curved guide disposed on the support surface, wherein the movable support mechanism comprises a plurality of support wheels, each support wheel of the plurality of support wheels being engaged with the curved guide such that said each wheel is constrained to move along a path defined by a curved guide.

9. A solar tower system of claim 7, wherein the solar azimuth tracking controller of each said heliostat comprises:
   a device for determining a sun azimuth angle,
   a processor for generating a control signal in response to the determined sun azimuth angle, and
   a motor for supplying a positioning force to said peripheral edge structure such that the carousel rotates by way of said passive movable support mechanism until the corresponding rotational position of the carousel causes said plurality of elongated flat mirror to reflect sunlight onto said solar receiver of a solar power harvesting system.

10. A solar tower system of claim 3,
wherein the base of each said heliostat comprises a first continuously curved wall portion and a straight wall portion connected across edges of the first continuously curved wall portion,
wherein the solar azimuth tracking controller of each said heliostat comprises means for supplying a positioning force to said first continuously curved wall portion such that the carousel is rotated around the central axis into a first said rotational position in accordance with a determined sun azimuth angle,
wherein the tilt-mechanism of each said heliostat comprises a second continuously curved wall portion and a second straight wall portion connected across edges of the second continuously curved wall portion, wherein the second continuously curved wall portion is concentrically disposed and supported by the first continuously curved wall portion, and
wherein the elevation tracking controller of each said heliostat includes means for causing said second continuously curved wall portion to move vertically relative to the first curved wall portion such that each elongated flat mirror is tilted into a first corresponding tilt angle in accordance with a determined sun elevation angle.

11. A solar tower system of claim 10,
wherein the second continuously curved wall portion of the tilt-mechanism of each said heliostat defines a plurality of slots, and
wherein each elongated flat mirror of the mirror array of each said heliostat includes a first rod that is rotatably connected at each end to the first continuously curved wall portion, and a second rod that is slidably engaged at each end into corresponding slots of said plurality of slots such that concentric movement of the second continuously curved wall portion in a first direction relative to the first curved wall portion causes the corresponding tilt angle of said each elongated flat mirror to decrease, and such that concentric movement of the second continuously curved second wall in a second direction relative to the first continuously curved wall portion causes the corresponding tilt angle of said each elongated flat mirror to increase.

12. A solar tower system of claim 10,
wherein each said heliostat further comprises:
a plurality of rollers fixedly secured to an outside surface the continuously curved wall portion, and
a plurality of wedge structures disposed on an outside surface of the second continuously curved wall portion, and
wherein the second continuously curved wall portion of each said heliostat is concentrically mounted on the first continuously curved wall portion of each said heliostat such that each wedge structure of the plurality of wedge structures is supported on an associated roller of the plurality of rollers, and such that rotation of the second continuously curved wall portion relative to the first continuously curved wall portion around the central axis causes said each roller to roll along said associated wedge, whereby said second continuously curved wall portion moves in the direction of the central axis relative to the first continuously curved wall portion.

13. A solar tower system of claim 10,
wherein the solar azimuth tracking controller of each said heliostat comprises a first motor operably coupled to the first continuously curved wall portion such that force generated by the first motor causes the first continuously curved wall portion to rotate around the central axis, and wherein the solar elevation tracking controller comprises a second motor operably coupled to the second continuously curved wall portion such that force generated by the second motor causes the second continuously curved wall portion to rotate around the central axis,
whereby controlling said first and second motors such that a rate of rotation of the first continuously curved wall portion is different from a rate of rotation of said second continuously curved wall portion causes said each roller to roll along said associated wedge.

14. A solar tower system of claim 2, wherein the plurality of heliostats are arranged in a closely-spaced pattern, and wherein, when the carousels of said plurality of heliostats are rotated such that the straight wall portions of all of said heliostats are parallel, a service pathway is formed between the carousels that allows access to any said heliostat of said array.

15. A solar tower system of claim 14, wherein the closely-spaced pattern comprises a square pattern in which the plurality of heliostats are aligned in a plurality of parallel rows and a plurality of parallel columns on said support surface, and wherein the mirror positioning system of all of said plurality of heliostats in an adjacent pair of said rows are disposed in areas of said support surface located between said plurality of heliostats of said adjacent pair of said rows.

16. A solar tower system of claim 15, wherein the mirror positioning system of each of said plurality of heliostats further comprises means for rotating said carousel such that the straight wall portion of each said heliostat is aligned in parallel with said parallel rows and faces away from the mirror positioning system of said each heliostat.

17. A solar tower system of claim 14, wherein the closely-spaced pattern comprises a hexagonal pattern in which the plurality of heliostats are aligned in a plurality of offset parallel columns on said support surface, and wherein the mirror positioning system of all of said plurality of heliostats in an adjacent pair of said offset parallel columns are disposed in areas of said support surface located between said plurality of heliostats of said adjacent pair of said offset parallel columns.

18. A solar tower system of claim 17, wherein the mirror positioning system of each of said plurality of heliostats of said group further comprises means for rotating said carousel such that the straight wall portion of each said heliostat is aligned in parallel with said offset parallel columns and faces away from the mirror positioning system of said each heliostat.

19. A co-generation power plant utilizing both a solar tower system and a conventional natural gas heat generator to generate steam in a steam production facility that is operably coupled to a steam turbine such that steam generated in the steam production facility drives the steam turbine, wherein the solar tower system comprises:
a heat-exchange-type solar receiver having a conduit containing a heat transfer fluid, and means for transferring the heat transfer fluid from the solar receiver to a heat exchanger disposed inside the steam production facility; and
an array including a plurality of heliostats disposed on a support surface adjacent to the solar receiver, each heliostat including:
a rotatable carousel having a substantially D-shaped base including a peripheral edge structure surrounding a central region, the base being disposed on the support surface such that the peripheral edge structure is rotatatable around a central axis located in the central region, a mirror array including a plurality of elongated flat mirrors arranged in a low-profile, substantially horizontal plane and disposed in the central region, each elongated flat mirror being movably connected to and simply supported between corresponding portions of the peripheral edge structure such that said each elongated flat mirror is maintained in a corresponding tilt angle; and a mirror positioning system fixedly disposed on the support surface adjacent to the carousel, the mirror positioning system including:

a solar elevation tracking controller including means for adjusting the tilt angle of each of the plurality of elongated flat mirrors in accordance with a determined sun elevation angle such that sunlight directed onto the mirror array from said determined sun elevation angle is reflected by all of the plurality of elongated flat mirrors onto the solar receiver, and a solar azimuth tracking controller including means operably connected to the peripheral wall for adjusting the rotational position of the carousel around the central axis in accordance with a determined sun azimuth angle such that sunlight directed onto the mirror array from said determined sun azimuth angle is reflected by all of the plurality of elongated flat mirrors onto the solar receiver.

* * * * *